(12) United States Patent
Hashimoto et al.

(10) Patent No.: US 12,128,556 B2
(45) Date of Patent: Oct. 29, 2024

(54) ROBOT SYSTEM

(71) Applicants:Kawasaki Jukogyo Kabushiki Kaisha, Kobe (JP); Kyoto Seisakusho Co., Ltd., Kyoto (JP)

(72) Inventors: Takeshi Hashimoto, Kobe (JP); Shogo Kubota, Kobe (JP); Hiroto Kitaura, Kobe (JP); Takashi Sasaki, Kyoto (JP)

(73) Assignees: KAWASAKI JUKOGYO KABUSHIKI KAISHA, Kobe (JP); KYOTO SEISAKUSHO CO., LTD., Kyoto (JP)

( * ) Notice: Subject to any disclaimer, the term of this patent is extended or adjusted under 35 U.S.C. 154(b) by 374 days.

(21) Appl. No.: 17/624,371

(22) PCT Filed: Jul. 6, 2020

(86) PCT No.: PCT/JP2020/026492
§ 371 (c)(1),
(2) Date: Jan. 3, 2022

(87) PCT Pub. No.: WO2021/006255
PCT Pub. Date: Jan. 14, 2021

(65) Prior Publication Data
US 2022/0355466 A1    Nov. 10, 2022

(30) Foreign Application Priority Data

Jul. 5, 2019 (JP) .................... 2019-126077

(51) Int. Cl.
*B25J 11/00* (2006.01)
*B25J 9/00* (2006.01)
(Continued)

(52) U.S. Cl.
CPC ......... *B25J 9/0087* (2013.01); *B25J 15/0616* (2013.01); *B65B 43/285* (2013.01)

(58) Field of Classification Search
CPC ...... B25J 9/0087; B25J 15/0616; B25J 18/00; B25J 9/161; B25J 9/1679; B25J 11/00;
(Continued)

(56) References Cited

U.S. PATENT DOCUMENTS 10,279,941 B2 * 5/2019 Hansen ................. B31B 50/005
2012/0101628 A1 * 4/2012 Hahn ..................... B65B 5/105
414/788.1
(Continued)

FOREIGN PATENT DOCUMENTS

EP    2 749 383 A1    7/2014
JP    2005-001304 A    1/2005
(Continued)

*Primary Examiner* — Masud Ahmed
(74) *Attorney, Agent, or Firm* — XSENSUS LLP

(57) ABSTRACT

A robot system includes: a hand that holds an article; an arm that moves the hand; and a first contacting portion with which a first foldable portion of the article is brought into contact during a first folding process that is a process of folding the first foldable portion in a state where the article is held by the hand. The hand includes: a base that is connected to the arm; and a holder that is rotatable relative to the base and holds the article by adhesion. During the first folding process, the hand and the arm fold the first foldable portion by rotating the holder while keeping the first foldable portion in contact with the first contacting portion.

10 Claims, 18 Drawing Sheets

(51) Int. Cl.
*B25J 15/06* (2006.01)
*B65B 43/28* (2006.01)

(58) Field of Classification Search
CPC .. B25J 15/0066; B65B 43/285; B65B 43/465; B65B 43/265; B65B 43/28
See application file for complete search history.

(56) References Cited

U.S. PATENT DOCUMENTS

| | | | | |
|---|---|---|---|---|
| 2013/0036716 | A1* | 2/2013 | Tsutsumi | B65B 7/20 53/564 |
| 2017/0290345 | A1* | 10/2017 | Garden | A21C 9/08 |
| 2020/0406570 | A1* | 12/2020 | Hirata | B31B 50/07 |
| 2023/0009062 | A1* | 1/2023 | Coulon | B25J 9/161 |
| 2023/0234233 | A1* | 7/2023 | Goyal | G06T 7/269 |
| 2024/0051692 | A1* | 2/2024 | Robèrt | B65B 11/04 |

FOREIGN PATENT DOCUMENTS

| | | |
|---|---|---|
| JP | 2013-52925 A | 3/2013 |
| JP | 2015-505785 A | 2/2015 |
| JP | 2017-170624 A | 9/2017 |
| JP | 2018-39181 A | 3/2018 |
| WO | 2019/103114 A1 | 5/2019 |

\* cited by examiner

ROBOT SYSTEM

CROSS-REFERENCE TO RELATED APPLICATIONS

The present application is based on PCT filing PCT/JP2020/026492, filed Jul. 6, 2020, which claims priority to JP 2019-126077, filed Jul. 5, 2019, the entire contents of each are incorporated herein by reference.

TECHNICAL FIELD

The present disclosure relates to a robot system.

BACKGROUND ART

In recent years, automation of work has been advanced in the field of logistics. For example, the work of packing a delivery article in a cardboard case includes multiple steps, such as assembling a cardboard case, packing a delivery article in the cardboard case, and sealing the cardboard case. The assembling step includes, for example, opening a collapsed cardboard case, folding bottom flaps of the cardboard case, and sealing the bottom flaps. For example, Patent Literature 1 discloses a case former that performs the step of assembling a cardboard case. The case former includes: a robotic arm; a suction nozzle disposed at an end of the robotic arm; and a folder that folds four bottom flaps of a cardboard case. The robotic arm holds and lifts a collapsed cardboard case by suction with the suction nozzle, tilts the cardboard case to expand it into a three-dimensional shape by utilizing the weight of the cardboard case, and then sets the expanded cardboard case on the folder. The folder drives four movable plates arranged around the four flaps of the cardboard case to turn, thereby folding the flaps.

CITATION LIST

Patent Literature

PTL 1: Japanese National Phase PCT Laid-Open Application Publication No. 2015-505785

SUMMARY OF INVENTION

Technical Problem

The folder of Patent Literature 1 includes four movable plates and hydraulic or pneumatic cylinders that drive the movable plates to turn. Therefore, the configuration for folding the bottom flaps of a cardboard case is complex.

In view of the above, an object of the present disclosure is to provide a robot system with a simplified configuration for folding foldable portions of an article.

Solution to Problem

In order to achieve the above object, a robot system according to one aspect of the present disclosure includes: a hand that holds an article; an arm that moves the hand; and a first contacting portion with which a first foldable portion of the article is brought into contact during a first folding process that is a process of folding the first foldable portion in a state where the article is held by the hand. The hand includes: a base that is connected to the arm; and a holder that is rotatable relative to the base and holds the article by adhesion. During the first folding process, the hand and the arm fold the first foldable portion by rotating the holder while keeping the first foldable portion in contact with the first contacting portion.

Advantageous Effects of Invention

The technique according to the present disclosure makes it possible to simplify a configuration for folding foldable portions of an article.

DESCRIPTION OF EMBODIMENTS

Hereinafter, embodiments of the present disclosure are described with reference to the accompanying drawings. The embodiments below describe comprehensive or specific examples. Among the components in the embodiments below, components that are not recited in the independent claim defining the most generic concept of the present disclosure are described as optional components. Each of the accompanying drawings is a schematic drawing, and is not necessarily an exactly illustrated drawing. In each drawing, substantially the same components are denoted by the same reference signs, and in some cases, redundant descriptions are omitted or simplified. In the present specification and the claims, "an apparatus" or "a device" can mean not only a single apparatus or a single device, but also a system including multiple apparatuses or multiple devices.

<Configuration of Robot System>

Figure 1:
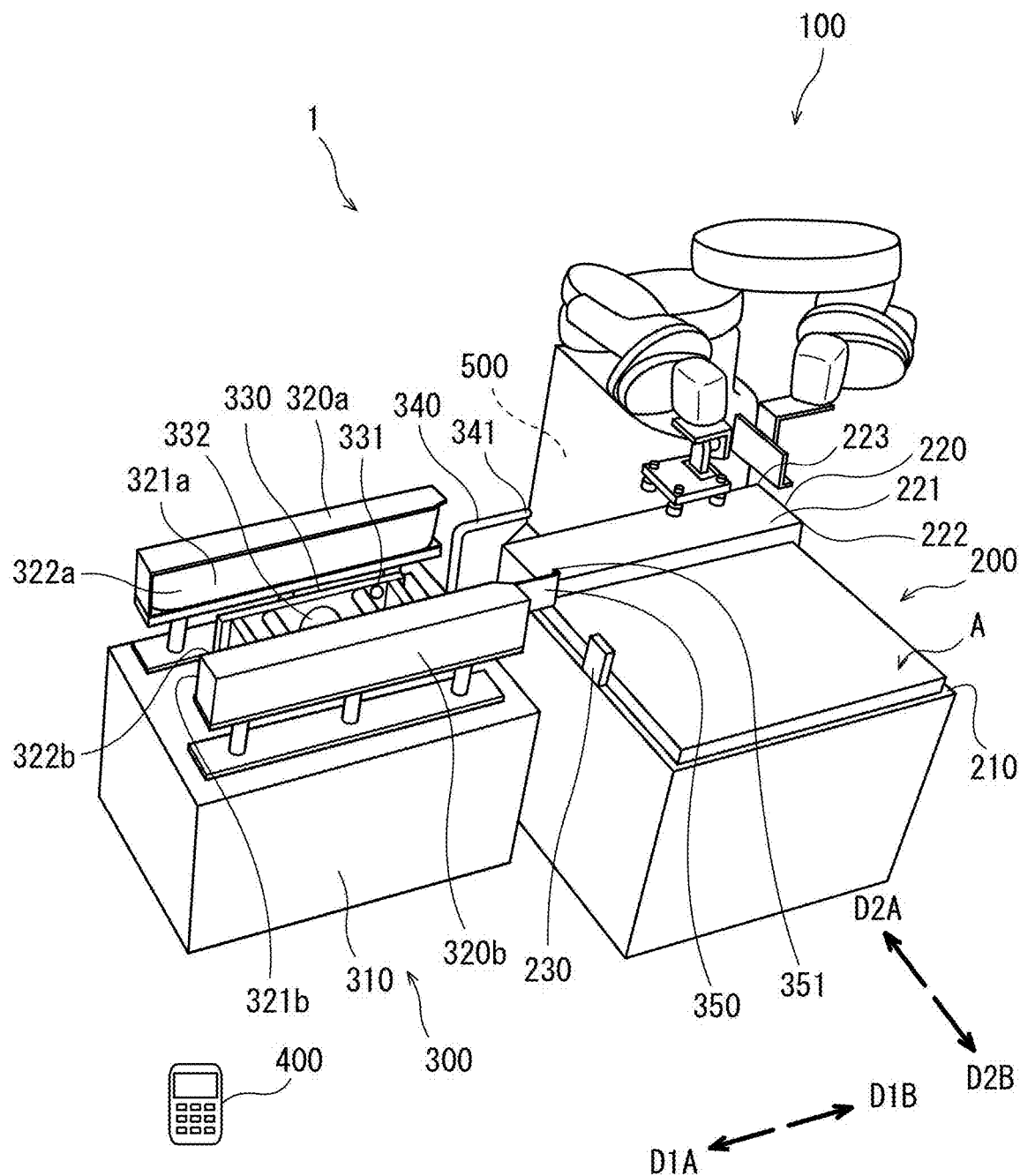
FIG. 1 is a perspective view showing one example of the configuration of a robot system according to an embodiment.

Hereinafter, the configuration of a robot system 1 according to an embodiment is described. FIG. 1 is a perspective view showing one example of the configuration of the robot system 1 according to the embodiment. The embodiment below describes the robot system 1 as a system for performing the work of assembling a collapsed article A into a box shape, specifically a bottomed tubular shape, by using a robot 100, i.e., as a system for performing case forming. The work to which the robot system 1 is applied includes a step of folding foldable portions of the article A. In the present embodiment, the article A to be assembled is a cardboard case. The shape of the cardboard case when it is open and its top and bottom are sealed is rectangular parallelepiped. In the present specification and the claims, to "open" a cardboard case means to put a collapsed sheet-shaped cardboard case into a three-dimensional tubular shape, such as a rectangular tubular shape. In the description below, "article A" is also referred to as "cardboard case A."

As shown in FIG. 1, the robot system 1 includes the robot 100, a placement table 200, a sealing table 300, an inputter 400, and a controller 500. The robot 100 and the sealing table 300 are disposed adjacently to the placement table 200. In the present embodiment, the controller 500 is disposed in the robot 100. Alternatively, the controller 500 may be disposed in a different apparatus, such as the placement table 200.

The robot 100 assembles a collapsed cardboard case A placed on the placement table 200 into a box-shaped cardboard case A, and transfers the box-shaped cardboard case A to the sealing table 300. The sealing table 300 seals the bottom flaps of the box-shaped cardboard case A with tape, and then conveys the box-shaped cardboard case to the next step. One example of the next step is a step of packing an article into the box-shaped cardboard case A, the bottom flaps of which have been sealed.

In the present specification and the claims, a collapsed cardboard case A means a sheet-shaped cardboard case in a collapsed or flat-folded state, which is a cardboard case in a flattened state before being assembled, i.e., before being opened. A box-shaped cardboard case A means a partly assembled cardboard case having a three-dimensional shape, i.e., a previously collapsed cardboard case A that has been opened and whose bottom has been formed by folded bottom flaps. The box-shaped cardboard case A is in a state where the bottom thereof is unsealed and the top flaps thereof are unfolded and unsealed.

[Placement Table]

The placement table 200 includes a placement surface 210, a lower auxiliary member 220, and a stopper 230. The placement surface 210 is a flat horizontal top surface of the placement table 200, on which collapsed cardboard cases A stacked one on top of another are placeable.

The lower auxiliary member 220 is disposed at the top of the placement table 200, and protrudes upward of the placement surface 210. In the present embodiment, the lower auxiliary member 220 has a rectangular parallelepiped shape whose longitudinal direction is a first direction D1. The lower auxiliary member 220 is adjacent to the placement surface 210 in a second direction D2, which is orthogonal to the first direction D1. The lower auxiliary member 220 includes a flat top surface 221, on which a box-shaped cardboard case A is placeable. In a state where collapsed cardboard cases A are placed on the placement surface 210, the top surface 221 is located above these collapsed cardboard cases A. The top surface 221 includes two corner portions 222 and 223, each of which extends along the placement surface 210. The corner portion 222 is a closer corner portion to the placement surface 210. The top surface 221 and the corner portion 222 serve as a first lower contacting portion and a second lower contacting portion, respectively. In the description below, the "top surface 221" and the "corner portion 222" are also referred to as a "first lower contacting portion 221" and a "second lower contacting portion 222." The lower contacting portions 221 and 222 are collectively an example of a first contacting portion or a second contacting portion.

The first direction D1 includes two directions that are a first direction D1A and a first direction D1B. The first direction D1A is a direction from the placement table 200 toward the sealing table 300. The first direction D1B is a direction opposite the first direction D1A. In the description below, in the case of distinguishing these two directions from each other, the terms "first direction D1A" and "first direction D1B" may be used, whereas in the case of not distinguishing these two directions from each other, the term "first direction D1" may be used. The second direction D2 includes two directions that are a second direction D2A and a second direction D2B. The second direction D2A is a direction from the placement surface 210 toward the lower auxiliary member 220. The second direction D2B is a direction opposite the second direction D2A. In the description below, in the case of distinguishing these two directions from each other, the terms "second direction D2A" and "second direction D2B" may be used, whereas in the case of not distinguishing these two directions from each other, the term "second direction D2" may be used.

The term "upward" herein means, in a case where the robot 100, the placement table 200, and the sealing table 300 are arranged on a horizontal surface such as a horizontal floor, a direction extending from the lower side toward the upper side. The term "downward" herein means a direction extending from the upper side toward the lower side in the above case. The term "horizontal direction" herein means a horizontal direction in the above case, and is a direction parallel to the aforementioned surface. The term "vertical direction" herein means the vertical direction in the above case, and is a direction perpendicular to the aforementioned surface. The first direction D1 and the second direction D2 are directions extending along the aforementioned surface.

The stopper 230 is disposed such that it is adjacent to the placement surface 210 in the first direction D1 (in the present embodiment, the first direction D1A). Similar to the lower auxiliary member 220, the stopper 230 protrudes upward of the placement surface 210. The stopper 230 and the lower auxiliary member 220 position a collapsed cardboard case A on the placement surface 210. The collapsed cardboard case A is positioned at a predetermined horizontal position relative to the placement surface 210 by being placed on the placement surface 210 in such a manner that two peripheral side edges of the collapsed cardboard case A are in contact with a side surface of the lower auxiliary member 220 and the stopper 230, respectively.

[Sealing Table]

The sealing table 300 seals the bottom flaps of the box-shaped cardboard case A transferred from the placement table 200. The sealing table 300 includes a base 310, conveyors 320a and 320b, and a sealer 330.

The conveyors 320a and 320b are disposed on the base 310, such that each of their longitudinal directions is the first direction D1. The conveyor 320a is disposed such that it is spaced apart from the conveyor 320b in the second direction D2A. The space between the conveyors 320a and 320b has such a size that the box-shaped cardboard case A in a state where the bottom thereof faces downward can be passed through the space. The size of the space may be close to the width of the box-shaped cardboard case A in this state in one direction, or close to the width in the other direction.

The conveyors 320a and 320b, by allowing the box-shaped cardboard case A to pass therebetween, conveys the box-shaped cardboard case A in the first direction D1A while positioning the box-shaped cardboard case A in the second direction D2. One of or both the conveyors 320a and 320b may be movable in the second direction D2 so that the size of the space between the conveyors 320a and 320b can be changed and box-shaped cardboard cases A in various sizes can be passed between the conveyors 320a and 320b.

In the present embodiment, the conveyors 320a and 320b are belt conveyors. The conveyor 320a includes an endless annular conveyor belt 321a, rollers (not shown) that cause the conveyor belt 321a to move around them; and a driver (not shown) that drives the rollers to rotate. The conveyor 320b includes an endless annular conveyor belt 321b, rollers (not shown) that cause the conveyor belt 321b to move around them, and a driver (not shown) that drives the rollers to rotate. The conveyor belt 321a forms a conveying surface 322a, which faces in the second direction D2B. The conveyor belt 321b forms a conveying surface 322b, which faces in the second direction D2A. The conveying surfaces 322a and 322b face each other in the second direction D2, and are substantially parallel to each other. Each of the drivers is, for example, an electric motor. The drivers of the conveyors 320a and 320b drive the rotation of the rollers to cause the conveyor belts 321a and 321b to move around the rollers, such that the conveying surfaces 322a and 322b are moved in the first direction D1A. The conveyor belts 321a and 321b convey the box-shaped cardboard case A, which contacts the conveying surfaces 322a and 322b between the conveyor belts 321a and 321b, in the first direction D1A while positioning the box-shaped cardboard case A in the second direction D2.

The sealer 330 seals the bottom flaps of the box-shaped cardboard case A, which is conveyed and passed over the sealer 330 by the conveyors 320a and 320b. The sealer 330 is disposed on the base 310 between the conveyors 320a and 320b, and is adjacent to the lower auxiliary member 220 in the first direction D1A. The height of the top of the sealer 330 is equal to the height of the top surface 221 of the lower auxiliary member 220. Accordingly, the box-shaped cardboard case A is smoothly movable from the top surface 221 to the top of the sealer 330.

The sealer 330 includes a sealing sensor 331 and an affixer 332. The affixer 332 affixes tape to the bottom flaps of the box-shaped cardboard case A to seal the bottom flaps. The sealing sensor 331 detects the box-shaped cardboard case A present on top of the sealer 330, and outputs a signal indicating a detection result to the controller 500. When the controller 500 receives, from the sealing sensor 331, the signal indicating that the box-shaped cardboard case A has been detected, the controller 500 outputs a command to perform sealing to the affixer 332. In response, the affixer 332 starts up. Then, the affixer 332 affixes tape to, and thereby seals, the bottom flaps of the box-shaped cardboard case A located above the affixer 332. Positioning of the box-shaped cardboard case A in the second direction D2 is performed by the conveyors 320a and 320b. This makes it possible to affix the tape to the same position on the bottom of each of the box-shaped cardboard cases A with the affixer 332. Various sensors are usable as the sealing sensor 331, so long as the sealing sensor 331 can detect an object. For example, a photoelectric sensor (also referred to as a "beam sensor"), a laser sensor, an ultrasonic sensor, or a limit switch is usable as the sealing sensor 331. The sealer 330 is not particularly limited to a specific sealer, so long as the sealer 330 can bring tape into contact with, and affix the tape to, the bottom of the box-shaped cardboard case A that passes over the sealer 330. The sealer 330 may be realized by mechanical mechanisms without including electrical mechanisms, such as the sealing sensor 331 and a driver of the affixer 332.

An upper auxiliary member 340 and a lateral auxiliary member 350 are disposed on the sealing table 300. The upper auxiliary member 340 is disposed such that it is adjacent to the conveyor 320a in the first direction D1B. The upper auxiliary member 340 includes an upper contacting portion 341, which extends in the first direction D1B. The upper contacting portion 341 is located to be spaced apart upward from the lower contacting portions 221 and 222, and faces at least part of the lower contacting portions 221 and 222 (in the present embodiment, the upper contacting portion 341 faces part of the lower contacting portions 221 and 222). In the present embodiment, as a non-limiting example, the upper contacting portion 341 is a rod-shaped member that extends substantially parallel to the second lower contacting portion 222. For example, the upper auxiliary member 340 may be an L-shaped rod member that extends upward from the base 310 and then extends in the first direction D1B. The position to which the upper auxiliary member 340 is fixed is not limited to the base 310, but may be, for example, the conveyor 320a, the placement table 200, or the lower auxiliary member 220. The upper contacting portion 341 is one example of the first contacting portion or the second contacting portion.

The lateral auxiliary member 350 is disposed such that it is adjacent to the conveyor 320b in the first direction D1B. The lateral auxiliary member 350 extends in the first direction D1B, and the distal end of the lateral auxiliary member 350 includes a lateral contacting portion 351. The lateral contacting portion 351 extends in a direction crossing the first direction D1B, in which the upper contacting portion 341 extends. In the present embodiment, the lateral contacting portion 351 extends in an upward-downward direction that is substantially perpendicular to the first direction D1B. The lateral contacting portion 351 is disposed at a higher elevation than the lower contacting portions 221 and 222 of the lower auxiliary member 220. Further, the lateral contacting portion 351 is disposed such that it is shifted in the second direction D2B relative to the upper contacting portion 341 and the second lower contacting portion 222. For example, the lateral auxiliary member 350 may be an L-shaped plate member that extends in the first direction D1B from the conveyor 320b and then extends in the second direction D2A or D2B. The portion extending in the second direction D2A or D2B serves as the lateral contacting portion 351 whose rectangular main surface faces in the first direction D1B, and the longitudinal direction of the main surface is the upward-downward direction. The position to which the lateral auxiliary member 350 is fixed is not limited to the conveyor 320b, but may be, for example, the base 310 or the placement table 200. The lateral contacting portion 351 is one example of a third contacting portion.

[Robot]

Figure 2:
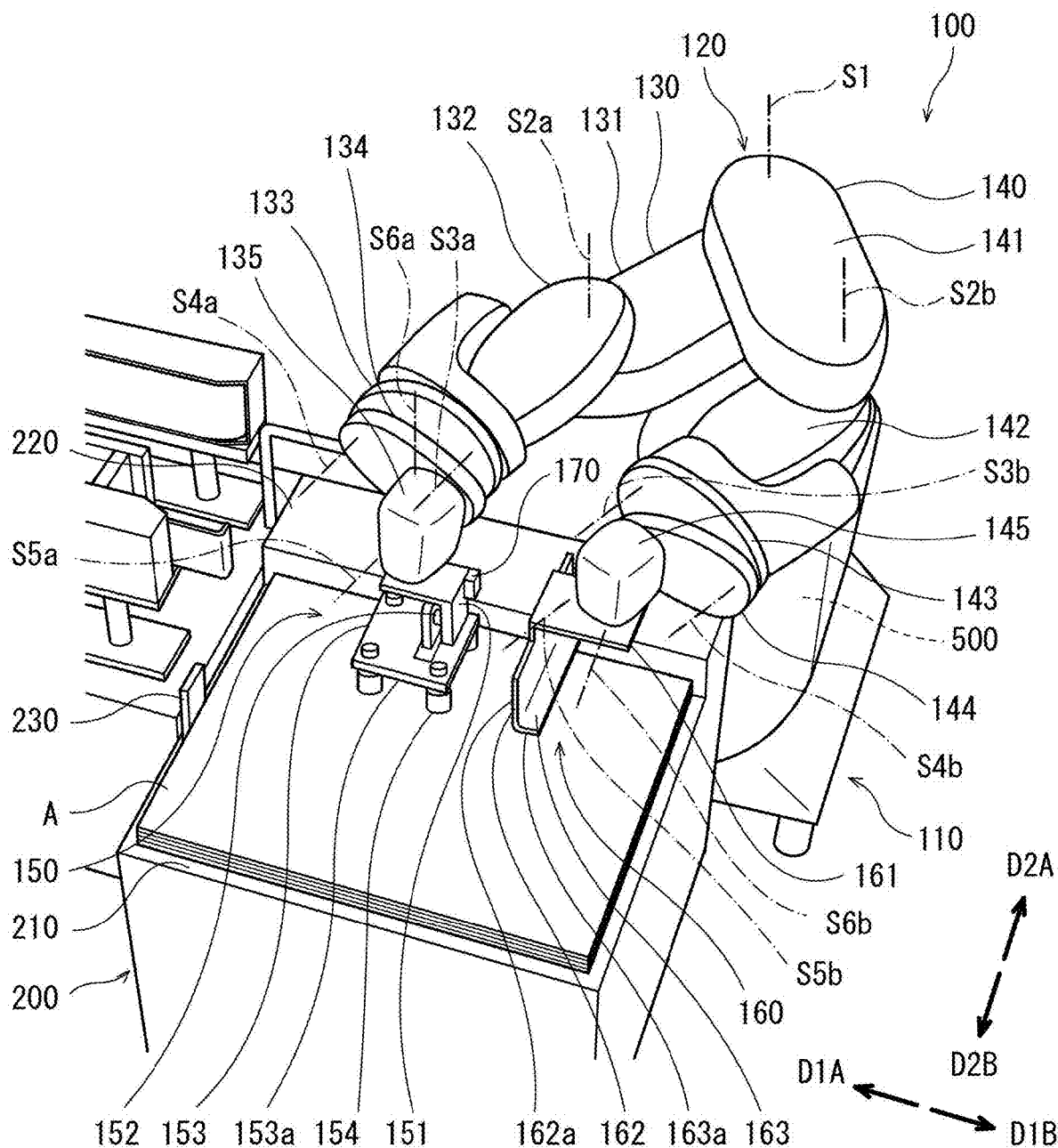
FIG. 2 is a perspective view showing a robot of FIG. 1 in an enlarged manner.

FIG. 2 is a perspective view showing the robot 100 of FIG. 1 in an enlarged manner. As shown in FIG. 2, the robot 100 includes a base 110 and a robot body 120. The robot body 120 is disposed on the base 110. In the present embodiment, the robot body 120 includes a first arm 130 and a second arm 140, which are coaxially rotatable in respective horizontal planes about a vertical first axis S1. The robot body 120 thus configured is a coaxial dual-arm robot.

Figure 3:
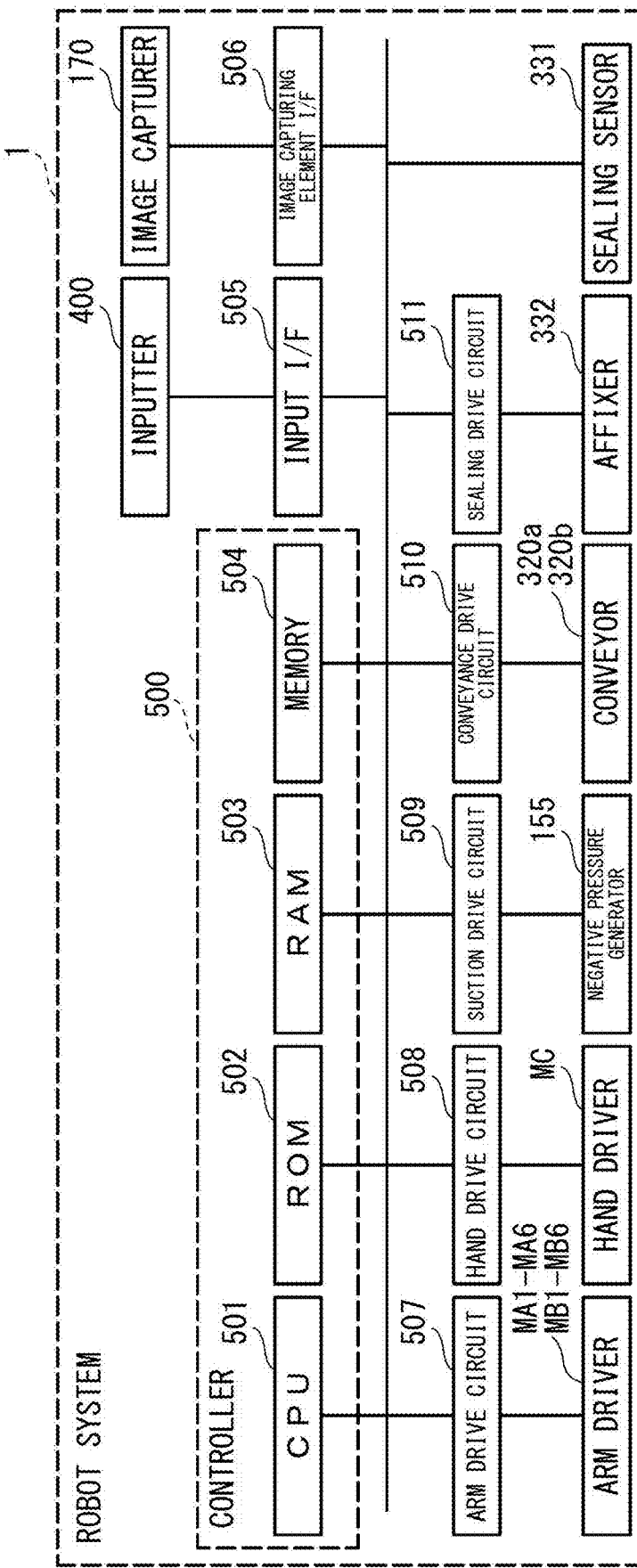
FIG. 3 is a block diagram showing one example of the hardware configuration of the robot system according to the embodiment.

The first arm 130 includes links 131 to 135 and arm drivers MA1 to MA6 (see FIG. 3). The second arm 140 includes links 141 to 145 and arm drivers MB1 to MB6 (see FIG. 3). The arm drivers MA1 to MA6 and MB1 to MB6 are, for example, electric motors such as servomotors. In the present embodiment, the arm drivers MA1 to MA6 and MB1 to MB6 are servomotors. Driving of the arm drivers MA1 to MA6 and MB1 to MB6 is controlled by the controller 500.

The first links 131 and 141 are connected to the base 110 via joints (not shown), such that the first links 131 and 141 are rotatable in respective horizontal planes about the first axis S1. The arm drivers MA1 and MB1 rotate the first links 131 and 141, respectively. The first links 131 and 141 are disposed such that they are shifted from each other in the direction of the first axis S1. The arms 130 and 140 can be operated independently of each other, and when the arms 130 and 140 are rotated about the first axis S1, interference between the arms 130 and 140 is suppressed. This allows each of the arms 130 and 140 to have a wide rotational range.

The second links 132 and 142 are connected to the first links 131 and 141, respectively, via joints (not shown), such that the second links 132 and 142 are rotatable in respective horizontal planes about respective vertical second axes S2a and S2b. The arm drivers MA2 and MB2 rotate the second links 132 and 142, respectively. The third links 133 and 143 are connected to the second links 132 and 142, respectively, via joints (not shown), such that the third links 133 and 143 are rotatable in respective vertical planes about respective horizontal third axes S3a and S3b. The arm drivers MA3 and MB3 rotate the third links 133 and 143, respectively. The fourth links 134 and 144 are connected to the third links 133 and 143, respectively, via joints (not shown), such that the fourth links 134 and 144 are rotatable in respective vertical planes about respective horizontal fourth axes S4a and S4b. The arm drivers MA4 and MB4 rotate the fourth links 134 and 144, respectively. The fifth links 135 and 145 are connected to the fourth links 134 and 144, respectively, via joints (not shown), such that the fifth links 135 and 145 are swingable about horizontal fifth axes S5a and S5b, respectively. The arm drivers MA5 and MB5 swing the fifth links 135 and 145, respectively.

The robot body 120 includes a first hand 150 at the distal end of the first arm 130 and a second hand 160 at the distal end of the second arm 140. The hands 150 and 160 hold a cardboard case A. The arms 130 and 140 move the hands 150 and 160, respectively. The hands 150 and 160 are connected to the fifth links 135 and 145, respectively, via joints (not shown), such that the hands 150 and 160 are rotatable about sixth axes S6a and S6b, respectively. The sixth axis S6a extends along the longitudinal direction of the fifth link 135, and is perpendicular to the fifth axis S5a. The sixth axis S6b extends along the longitudinal direction of the fifth link 145, and is perpendicular to the fifth axis S5b. The arm drivers MA6 and MB6 rotate the hands 150 and 160, respectively. The arms 130 and 140 configured as described above are horizontal articulated arms.

The second hand 160 includes a mounting portion 161, a lateral portion 162, and a lower portion 163. The mounting portion 161 is connected to the fifth link 145. For example, the mounting portion 161 is a rectangular plate-shaped member that is perpendicular to the sixth axis S6b.

The lateral portion 162 includes a flat contact surface 162a, and is connected to the mounting portion 161. For example, the lateral portion 162 is a narrow rectangular plate-shaped member that is perpendicular to the mounting portion 161, and includes a rectangular main surface that serves as the contact surface 162a. When the direction of the sixth axis S6b is the vertical direction, that is, the mounting portion 161 is horizontal, the contact surface 162a faces in a horizontal direction, and the longitudinal direction of the contact surface 162a is a horizontal direction.

The lower portion 163 includes a flat main surface 163a, and is connected to the lateral portion 162. For example, the lower portion 163 is a narrow rectangular plate-shaped member that is perpendicular to the lateral portion 162, and the main surface 163a is a rectangular surface. When the direction of the sixth axis S6b is the vertical direction, the main surface 163a faces downward, and the longitudinal direction of the main surface 163a is a horizontal direction. For example, the lateral portion 162 and the lower portion 163 are realized by an L-shaped member.

When the sixth axis S6b is in a vertical state, by rotating about the vertical sixth axis S6b, the second hand 160 can change the facing direction of the contact surface 162a into any horizontal direction while keeping the main surface 163a facing downward.

The first hand 150 includes a mounting base 151, a coupling rotating shaft 152, a holder 153, a suctioner or suctioners 154, and a hand driver MC (see FIG. 3). The mounting base 151 is rotatably connected to the fifth link 135, and also, rotatably connected to the holder 153 via the coupling rotating shaft 152. The coupling rotating shaft 152 is a shaft extending in a direction that crosses the direction of the sixth axis S6a, which is the direction in which the mounting base 151 and the fifth link 135 are connected to each other. In the present embodiment, the direction of the coupling rotating shaft 152 is orthogonal to the direction of the sixth axis S6a. For example, the mounting base 151 is L-shaped and includes: one plate-shaped member perpendicular to the sixth axis S6a; and another plate-shaped member perpendicular to the one plate-shaped member.

The holder 153 is rotatable relative to the mounting base 151, and holds a cardboard case A by adhesion. The holder 153 is rotatably connected to the mounting base 151 via the coupling rotating shaft 152. In the present embodiment, the holder 153 rotates together with the coupling rotating shaft 152. The holder 153 includes a flat main surface 153a, which is located on the opposite side of the holder 153 from the coupling rotating shaft 152. The suctioner(s) 154 is/are disposed on the flat main surface 153a. For example, the holder 153 is T-shaped and includes: one plate-shaped member connected to the mounting base 151; and another plate-shaped member that is perpendicular to the one plate-shaped member and that includes the main surface 153a.

The hand driver MC drives the rotation of the coupling rotating shaft 152 to cause the holder 153 to rotate about the coupling rotating shaft 152 relative to the mounting base 151. The hand driver MC is, for example, an electric motor such as a servomotor. In the present embodiment, the hand driver MC is a servomotor. Driving of the hand driver MC is controlled by the controller 500.

When the direction of the sixth axis S6*a* is the vertical direction, the coupling rotating shaft 152 extends in a horizontal direction, and the holder 153 is rotatable in a vertical plane about the coupling rotating shaft 152. In a case where the direction of the coupling rotating shaft 152 is not orthogonal to the direction of the sixth axis S6*a*, the direction of the coupling rotating shaft 152 can be changed into a horizontal direction by swinging the fifth link 135.

One or more suctioners 154 are disposed on the main surface 153*a* of the holder 153. In the present embodiment, four suctioners 154 are disposed on the main surface 153*a*. The suctioners 154 rotate together with the holder 153. The suctioners 154 generate negative pressure to suction a cardboard case A, and thereby the cardboard case A is adhered to the holder 153. For example, each suctioner 154 includes a nozzle having a hollow shape, such as a tapered tubular shape, and the suctioners 154 are connected to a negative pressure generator 155 (see FIG. 3) via piping. The nozzle is open in a direction perpendicular to the main surface 153*a*. The configuration of the negative pressure generator 155 is not particularly limited, and any existing configuration may be applied to the negative pressure generator 155, so long as the negative pressure generator 155 can generate negative pressure in the nozzle. For example, the negative pressure generator 155 may have a configuration of a vacuum pump or pneumatic cylinder that generates negative pressure or a vacuum by sucking air, or may have a configuration of an ejector that generates negative pressure or a vacuum by feeding compressed air. Driving of the negative pressure generator 155 is controlled by the controller 500.

The first hand 150 can rotate the holder 153 about the coupling rotating shaft 152 over a rotational angle range of at least 90°. For example, when the direction of the coupling rotating shaft 152 is a horizontal direction, the first hand 150 can change the facing direction of the suctioners 154, which is the facing direction of the nozzles, at least from a downward direction into a horizontal direction, or even further into an upward direction, by rotating the holder 153. For example, the first hand 150 may be able to change the facing direction of the suctioners 154 over 360° in a vertical plane.

The servomotors serving as the arm drivers MA1 to MA6 and MB1 to MB6 and the hand driver MC each include: an electric motor; an encoder that detects the rotational angle of the rotor of the electric motor; and a current sensor that detects an electric current value of the electric motor. Each servomotor operates the electric motor in accordance with, for example, a command outputted from the controller 500, and outputs values detected by the encoder and the current sensor to the controller 500. Based on the values that are detected by the encoder and the current sensor of each servomotor, the values being fed back from each servomotor, the controller 500 detects, for example, the amount of rotation and the rotational speed of the rotor of each servomotor. By using the detection results and so forth, the controller 500 controls, for example, start and stop of the rotation, rotational speed, and rotational torque of each servomotor. Accordingly, the controller 500 can stop each servomotor at an intended rotational position, rotate each servomotor at an intended rotational speed, and operate each servomotor with an intended rotational torque. Therefore, the controller 500 can operate the first arm 130, the second arm 140, and the holder 153 of the first hand 150 in various ways in a minute manner.

[Image Capturer]

As shown in FIG. 2, an image capturer 170 is disposed on the first arm 130, specifically on the mounting base 151 of the first hand 150. The image capturer 170 is a camera that captures an image for detecting a three-dimensional position of an image capturing subject relative to the image capturer 170, such as a distance to the image capturing subject. For example, the camera may be a digital image capturing camera, and may be a stereo camera, a monocular camera, a TOF camera (Time-of-Flight camera), a pattern projection camera such as a fringe projection camera, or a camera using a light-plane-intersecting method. The image capturer 170 is oriented in a direction along the sixth axis S6*a*, for example, in a downward direction. The image capturer 170 captures an image of the placement surface 210, thereby obtaining an image for detecting the three-dimensional position of a collapsed cardboard case A on the placement surface 210 relative to the image capturer 170. Based on the obtained image, the image capturer 170 may detect the three-dimensional position and output the detected position to the controller 500. Alternatively, the image capturer 170 may output the obtained image to the controller 500, and the controller 500 may calculate the three-dimensional position. In the present embodiment, the controller 500 calculates the three-dimensional position. The posture of the collapsed cardboard case A may also be detected.

[Inputter]

As shown in FIG. 1, the inputter 400 is a device that receives inputs of, for example, a command and information from a user such as an operator, and outputs the command, the information, and so forth to the controller 500. The configuration of the inputter 400 is not particularly limited. The inputter 400 is connected to the controller 500 via wired communications or wireless communications. Both the wired communications and the wireless communications may be any type of communications. For example, the inputter 400 receives a command to perform assembling of a collapsed cardboard case A on the placement table 200. The inputter 400 receives inputs of information for specifying the configuration of the cardboard case A to be assembled, such as the type, shape, size, and/or specifications of the cardboard case A.

[Controller]

The controller 500 controls the entire operation of the robot system 1. FIG. 3 is a block diagram showing one example of the hardware configuration of the robot system 1 according to the embodiment. As shown in FIG. 3, the robot system 1 includes the following components: a CPU (Central Processing Unit) 501; a ROM (Read Only Memory) 502; a RAM (Random Access Memory) 503; a memory 504; an input I/F (Interface) 505; an image capturing element I/F 506; an arm drive circuit 507; a hand drive circuit 508; a suction drive circuit 509; a conveyance drive circuit 510; a sealing drive circuit 511; the arm drivers MA1 to MA6 and MB1 to MB6; the hand driver MC; the negative pressure generator 155; the conveyors 320*a* and 320*b*; the sealing sensor 331 and the affixer 332 of the sealer 330; the image capturer 170; and the inputter 400. The CPU 501, the ROM 502, the RAM 503, and the memory 504 are included in the controller 500. The controller 500 may include at least one of the above circuits. The above components are connected to each other via a bus, wired communications, or wireless communications. Not all of the above components are essential.

The CPU 501 is a processor, and controls the entire processing and operation of the robot system 1. The ROM 502 is, for example, a nonvolatile semiconductor memory.

The ROM 502 stores, for example, a program and data for causing the CPU 501 to control the processing and operation. The RAM 503 is, for example, a volatile semiconductor memory. The RAM 503 temporarily stores, for example, a program to be executed by the CPU 501 and data that is being processed or that has been processed. The memory 504 is a storage device that is, for example, a semiconductor memory such as a volatile memory or a nonvolatile memory, an HDD (Hard Disk Drive), or an SSD (Solid State Drive).

An operation program for the CPU 501 is prestored in the ROM 502 or the memory 504. The CPU 501 reads out the program from the ROM 502 or the memory 504, and develops the program in the RAM 503. The CPU 501 executes coded instructions in the program developed in the RAM 503. Functions of the controller 500 may be realized by a computer system that is made up of, for example, the CPU 501, the ROM 502, and the RAM 503, or may be realized by a dedicated hardware circuit such as an electronic circuit or an integrated circuit, or may be realized by a combination of the above computer system and hardware circuit.

The input I/F 505 is connected to the inputter 400, and receives inputs of, for example, information and a command from the inputter 400. The input I/F 505 may include, for example, a circuit that converts input signals. The image capturing element I/F 506 controls the driving of an image capturing element (not shown) of the image capturer 170 in accordance with a command from the CPU 501. The image capturing element I/F 506 loads an image captured by the image capturer 170 into the RAM 503 or the memory 504. The image capturing element I/F 506 may include, for example, a circuit for driving the image capturer 170.

The arm drive circuit 507 controls the driving of each of the servomotors of the arm drivers MA1 to MA6 and MB1 to MB6 by feeding electric power to each of the servomotors in accordance with a command from the CPU 501. The hand drive circuit 508 controls the driving of the servomotor of the hand driver MC by feeding electric power to the servomotor in accordance with a command from the CPU 501. The suction drive circuit 509 controls the driving of the negative pressure generator 155 by feeding electric power to the negative pressure generator 155 in accordance with a command from the CPU 501. The conveyance drive circuit 510 controls the driving of each of the conveyors 320a and 320b by feeding electric power to each of the conveyors 320a and 320b in accordance with a command from the CPU 501. The sealing drive circuit 511 controls the driving of the affixer 332 by feeding electric power to the affixer 332 in accordance with a command from the CPU 501. The CPU 501 outputs the command to the sealing drive circuit 511 based on a detection signal received from the sealing sensor 331.

Figure 4:
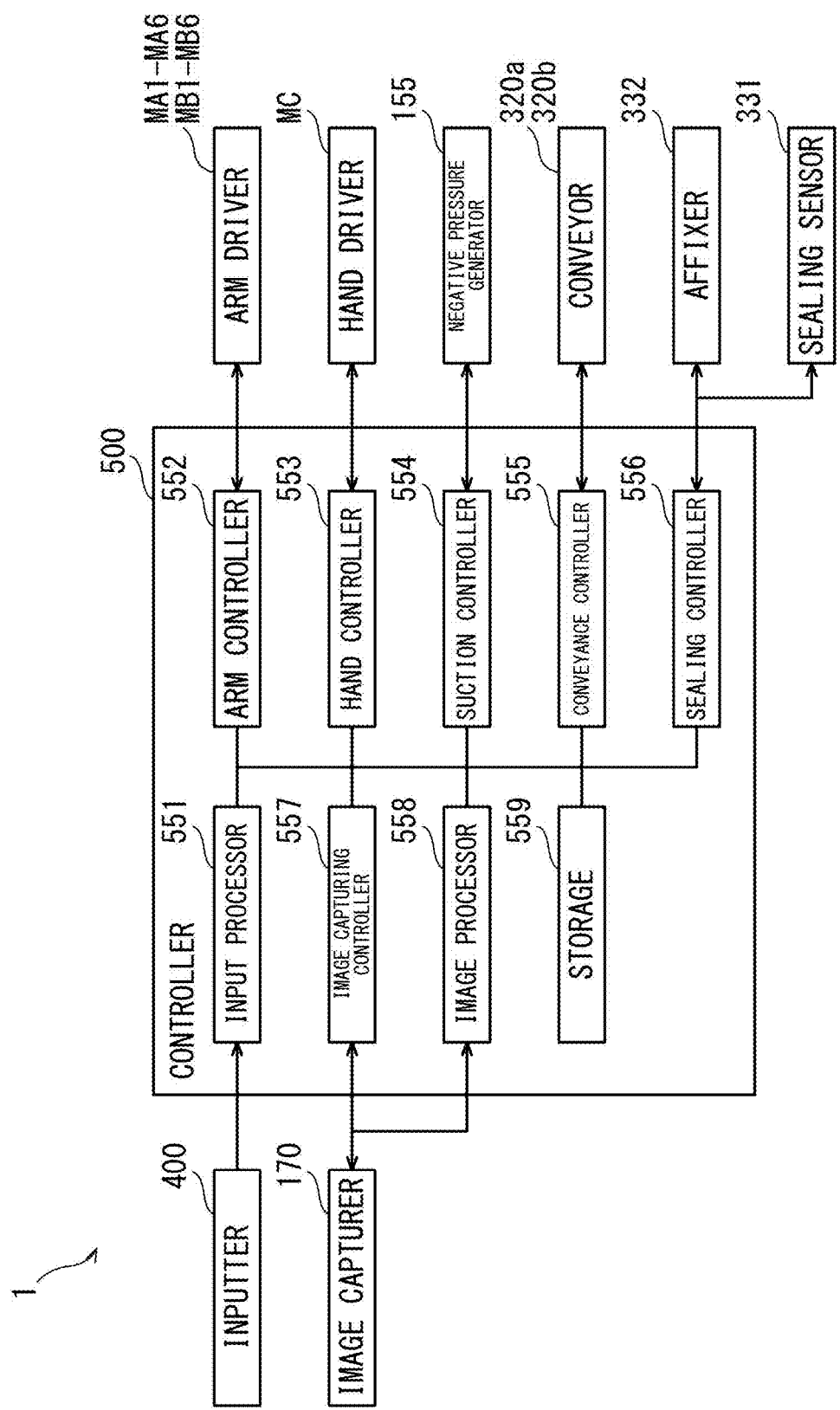
FIG. 4 is a block diagram showing one example of a functional configuration of a controller according to the embodiment.

FIG. 4 is a block diagram showing one example of a functional configuration of the controller 500 according to the embodiment. As shown in FIG. 4, the controller 500 includes the following functional components: an input processor 551; an arm controller 552; a hand controller 553; a suction controller 554; a conveyance controller 555; a sealing controller 556; an image capturing controller 557; an image processor 558; and a storage 559. The functions of the input processor 551, the arm controller 552, the hand controller 553, the suction controller 554, the conveyance controller 555, the sealing controller 556, the image capturing controller 557, and the image processor 558 are realized by, for example, the CPU 501. The function of the storage 559 is realized by, for example, the memory 504, the ROM 502, and the RAM 503.

Functional components that are the input processor 551, the arm controller 552, the hand controller 553, the suction controller 554, the conveyance controller 555, the sealing controller 556, the image capturing controller 557, and the image processor 558 each obtain operation information about other functional components from the other functional components, and each of these functional components uses the obtained information to realize its function. Each of the above functional components can operate together with, in coordination with, and/or in cooperation with other functional components. For example, the above functional components make it possible to operate, among the inputter 400, the arm drivers MA1 to MA6 of the first arm 130, the arm drivers MB1 to MB6 of the second arm 140, the hand driver MC of the first hand 150, the negative pressure generator 155, the conveyors 320a and 320b, the affixer 332, and the image capturer 170, at least one device while operating at least one other device. The controller 500 may further include a functional component that performs integrated control of the above functional components.

The storage 559 stores various information, and allows the stored information to be read out from the storage 559. The storage 559 stores a list of cardboard cases that can be assembled by the robot 100, and for each cardboard case in the list, stores information for specifying the configuration of the cardboard case, such as the type, shape, size, and/or specifications of the cardboard case. The storage 559 may store an image captured by the image capturer 170. The storage 559 may store a program.

The input processor 551 outputs commands and information obtained from the inputter 400 to the functional components of the controller 500.

The image capturing controller 557 controls the operation of the image capturer 170. For example, the image capturing controller 557 may cause the image capturer 170 to capture an image at a predetermined timing, such as immediately before the robot 100 starts assembling a collapsed cardboard case A on the placement table 200. This allows the controller 500 to detect the three-dimensional position of the collapsed cardboard case A relative to the first hand 150 and to control the robot 100 based on the three-dimensional position.

The image processor 558 uses the image captured by the image capturer 170 to detect the three-dimensional position of the collapsed cardboard case A shown in the image relative to the image capturer 170. The image processor 558 outputs the three-dimensional position to, for example, the arm controller 552.

The arm controller 552 controls the operation of the arm drivers MA1 to MA6 and MB1 to MB6 of the arms 130 and 140. The arm controller 552 controls the arm drivers MA1 to MA6 and MB1 to MB6 based on, for example, the configuration of the collapsed cardboard case A on the placement table 200 and the detection result from the image processor 558, thereby causing the arms 130 and 140 to make motions corresponding to the assembling of the collapsed cardboard case A. The arm controller 552 obtains operating amount information, such as rotation amounts, from the servomotors of the arm drivers MA1 to MA6 and MB1 to MB6, and based on the obtained operating amounts, detects position and posture information including the position, posture, moving direction, moving speed, etc. of the links of the arms 130 and 140 and the hands 150 and 160. The arm controller 552 outputs the detected position and posture information to the hand controller 553. Further, by using the position and posture information as feedback information, the arm controller 552 controls the operation of the arm drivers MA1 to MA6 and MB1 to MB6 to adjust the position, posture, and so forth of each of the hands 150 and 160 to an intended position, posture, and so forth.

The hand controller 553 controls the operation of the hand driver MC of the first hand 150. The hand controller 553 controls the hand driver MC based on the position and posture information about the first hand 150, thereby controlling the facing directions of the holder 153 and the suctioners 154 to directions corresponding to the assembling of the collapsed cardboard case A. The hand controller 553 obtains operating amount information, such as a rotation amount, from the servomotor of the hand driver MC, and based on the obtained operating amount, detects suction posture information including, for example, the facing directions of the holder 153 and the suctioners 154. Further, by using the suction posture information as feedback information, the hand controller 553 controls the operation of the hand driver MC.

The suction controller 554 controls the operation of the negative pressure generator 155. For example, based on the three-dimensional position detected by the image processor 558, the position and posture information about the first hand 150, and the suction posture information about the suctioners 154, the suction controller 554 starts the negative pressure generator 155 at a predetermined timing, and causes the suctioners 154 to suction the cardboard case A. The predetermined timing may be when the suctioners 154 have come into proximity to, or have come into contact with, the cardboard case A.

The conveyance controller 555 controls the operation of the conveyors 320a and 320b. For example, the conveyance controller 555 may cause the conveyors 320a and 320b to operate continuously while the robot 100 is performing the work of assembling the collapsed cardboard case A.

Based on a detection signal from the sealing sensor 331, the sealing controller 556 controls the operation of the affixer 332 of the sealer 330. For example, when the sealing sensor 331 detects a box-shaped cardboard case A, the sealing controller 556 may operate the affixer 332 to affix tape to, and thereby seal, the bottom of the box-shaped cardboard case A.

<Operations of Robot System>

Figure 5:
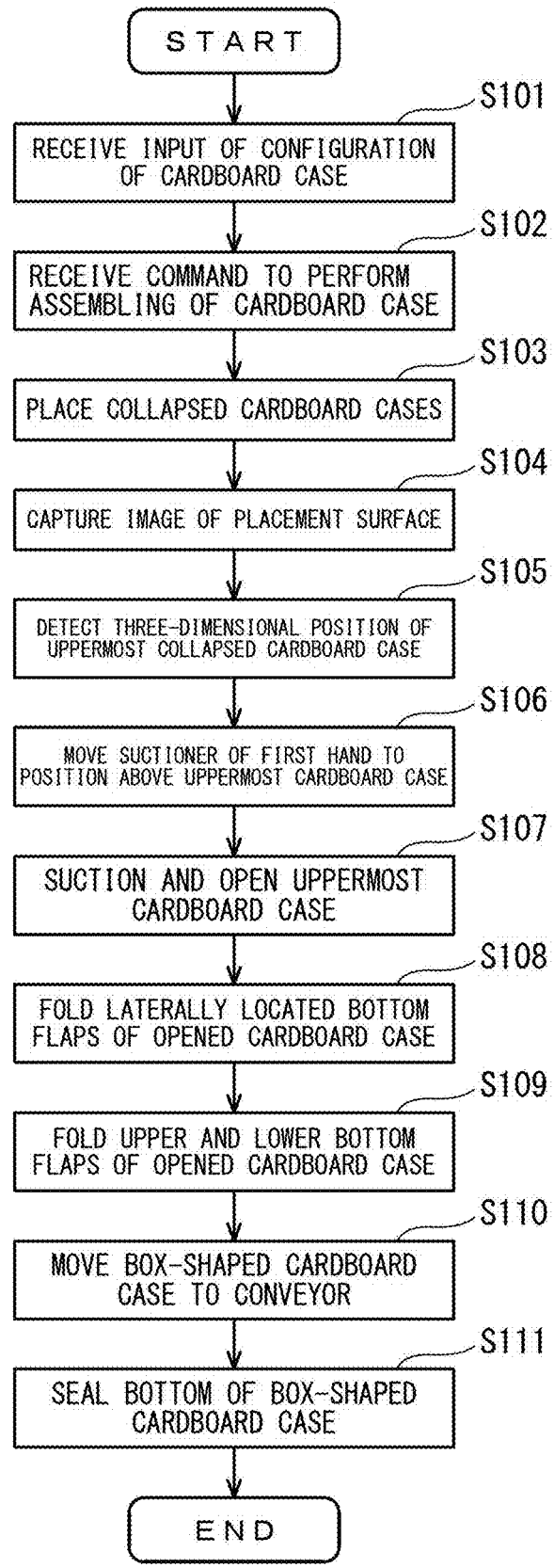
FIG. 5 is a flowchart showing one example of operations of the robot system according to the embodiment.
Figure 13:
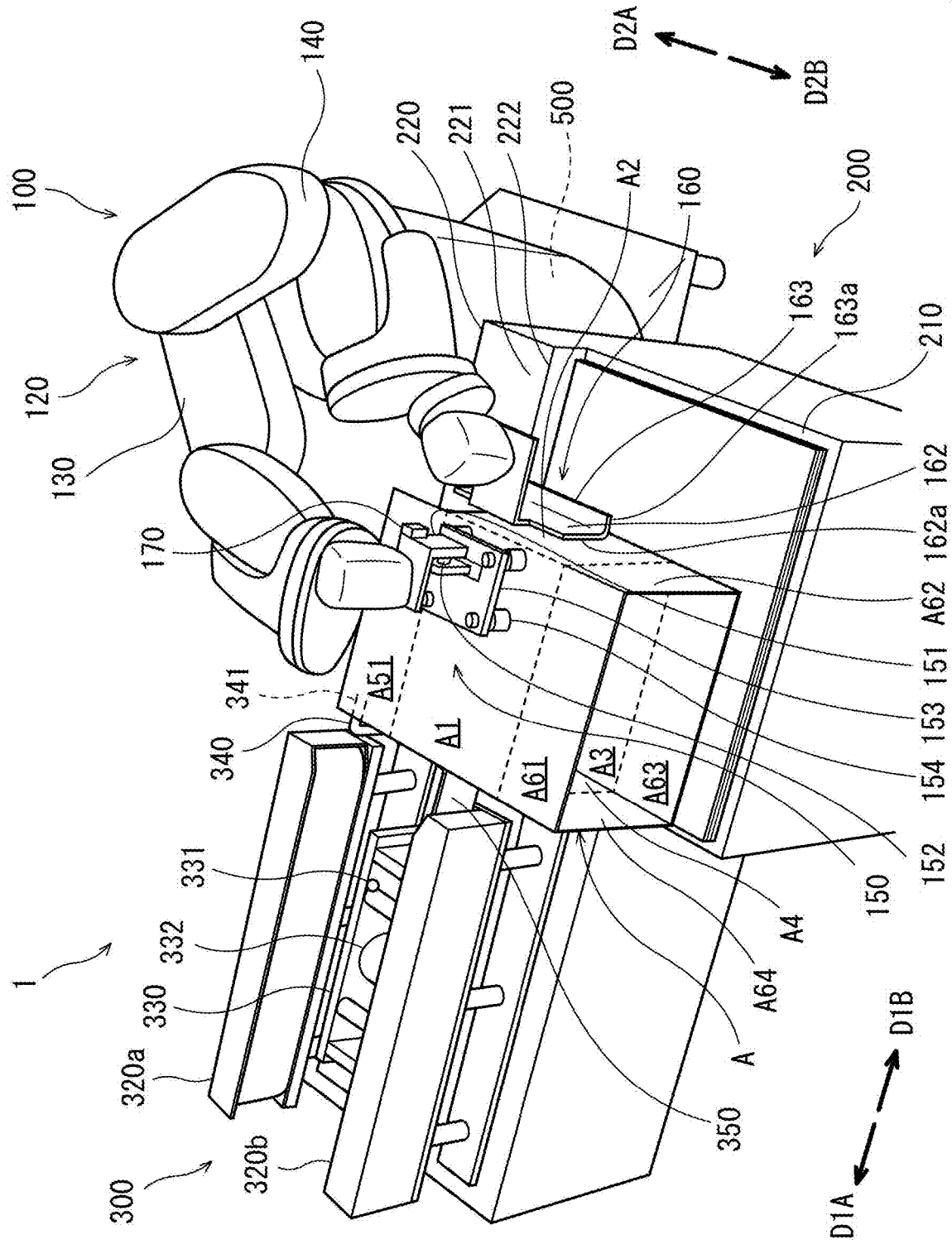
FIG. 13 is a perspective view showing one example of the state of the robot while the robot system according to the embodiment is in operation.
Figure 14:
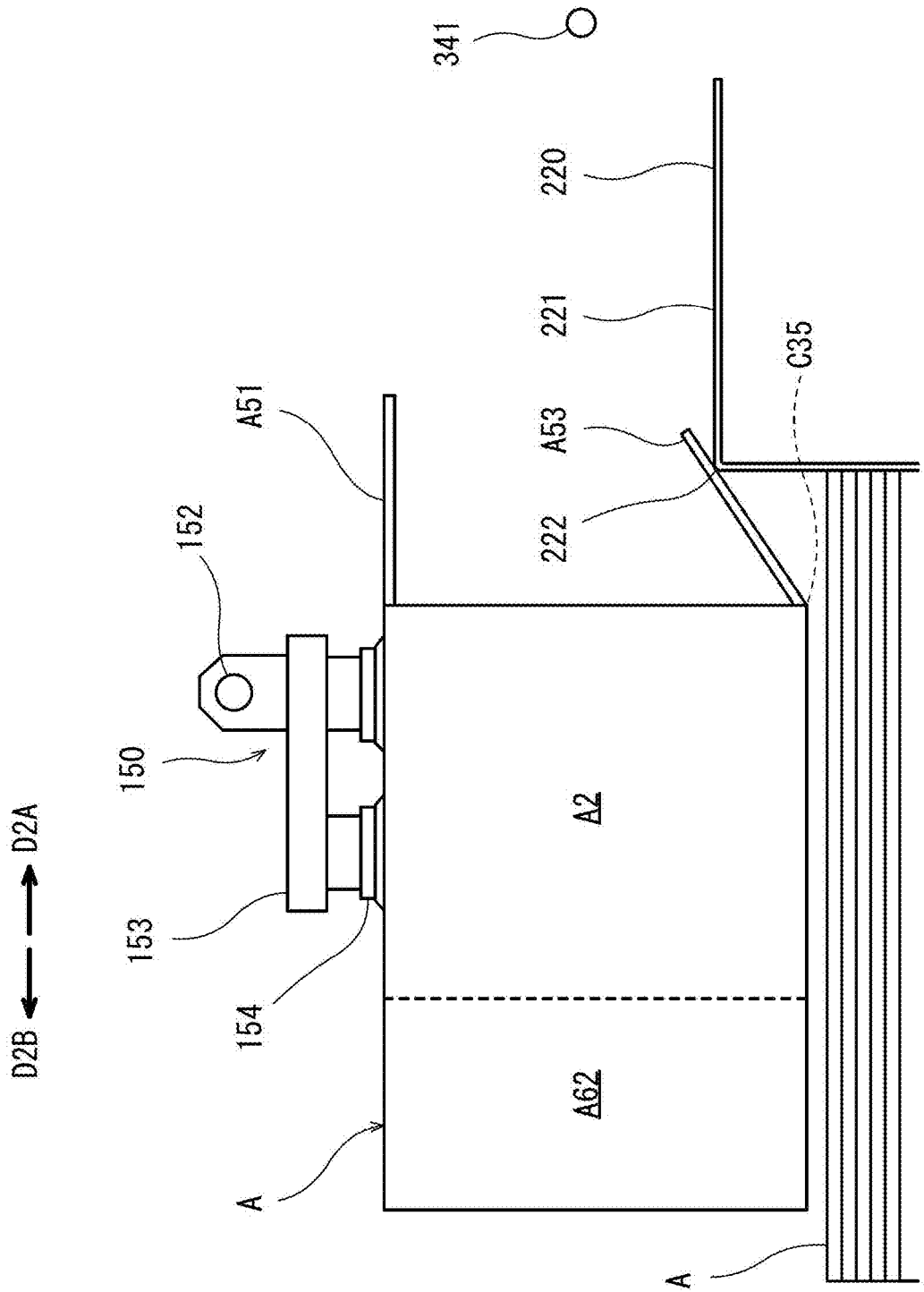
FIG. 14 is an enlarged side view of a part of FIG. 13.

Hereinafter, operations of the robot system 1 according to the embodiment are described. FIG. 5 is a flowchart showing one example of operations of the robot system 1 according to the embodiment. FIGS. 6 to 13, 15, 17, and 18 are perspective views each showing one example of the state of the robot 100 while the robot system 1 according to the embodiment is in operation. FIG. 14 is an enlarged side view of a part of FIG. 13, and FIG. 16 is an enlarged side view of a part of FIG. 15.

As shown in FIG. 5, first, the inputter 400 receives information about the configuration of a cardboard case A to be assembled, such as the type, shape, size, and/or specifications of the cardboard case A, the information being inputted by a user such as an operator, and outputs the received information to the controller 500 (step S101). Next, the inputter 400 receives a command to perform assembling of the cardboard case A, the command being inputted by the user, and outputs the received command to the controller 500 (step S102). The controller 500 performs processes in the steps described below based on the configuration of the cardboard case A received in step S101.

Next, as shown in FIG. 2 and FIG. 5, in step S103, collapsed cardboard cases A stacked one on top of another are placed on the placement surface 210 of the placement table 200. The collapsed cardboard cases A may be placed on the placement surface 210 by the user manually, or by another conveyor operated by the user, or by another conveyor that is operated autonomously. The controller 500 may detect the presence or absence of the collapsed cardboard cases A on the placement surface 210 based on, for example, a signal received from the other conveyor mentioned above, an image captured by the image capturer 170, or a detection signal from a sensor provided on, for example, the placement surface 210. The sensor may be of the same type as the sealing sensor 331.

Next, in step S104, the controller 500 causes the image capturer 170 to capture an image of the placement surface 210. The captured image shows an image of the collapsed cardboard cases A on the placement surface 210. Next, in step S105, by using the captured image, the controller 500 detects the three-dimensional position of the uppermost collapsed cardboard case A on the placement surface 210 relative to the image capturer 170. In this manner, the controller 500 obtains the three-dimensional position of the uppermost collapsed cardboard case A relative to the first hand 150.

Figure 6:
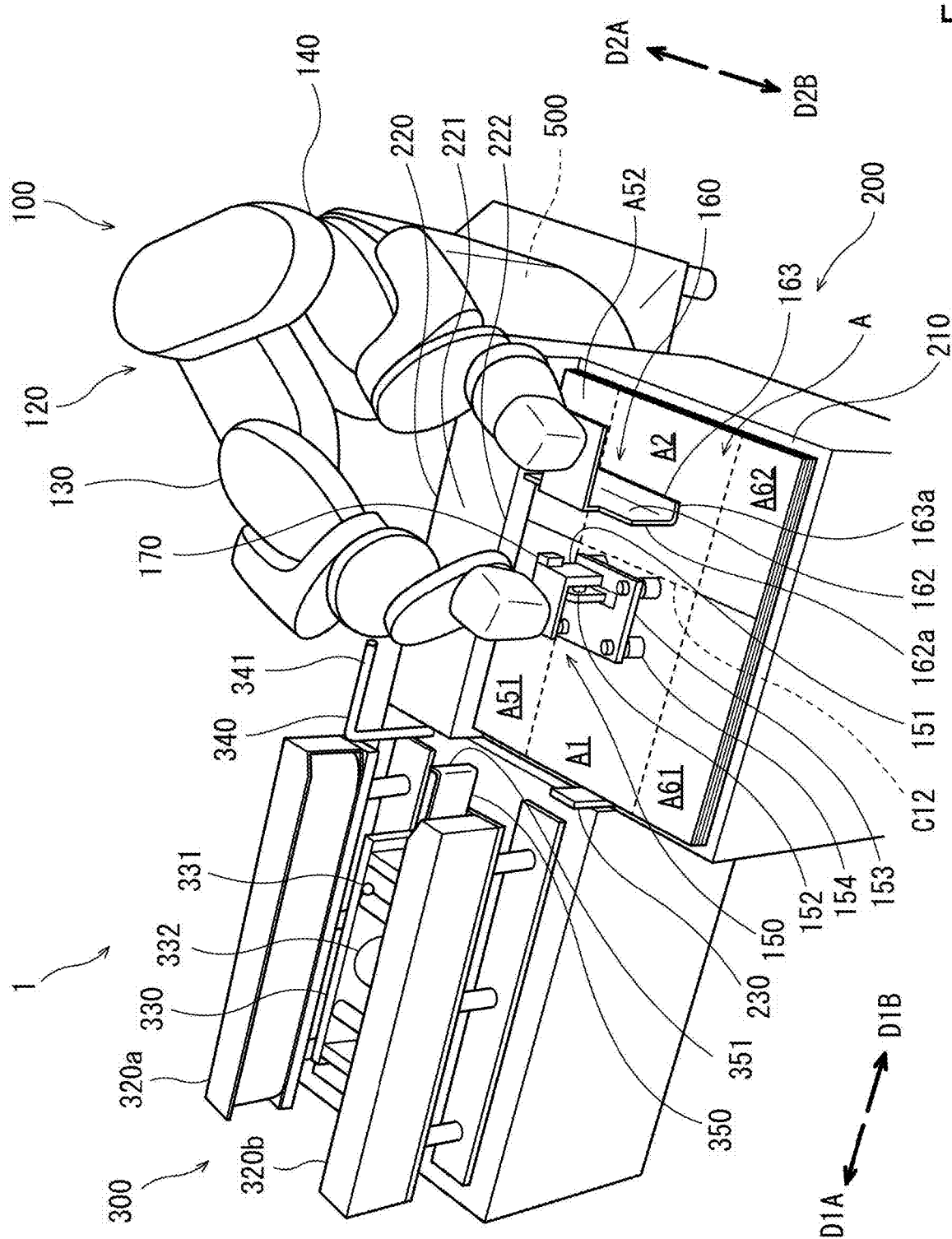
FIG. 6 is a perspective view showing one example of the state of the robot while the robot system according to the embodiment is in operation.

Next, as shown in FIG. 5 and FIG. 6, in step S106, based on the three-dimensional position obtained in step S105, the controller 500 operates the first arm 130 and the first hand 150 to move the suctioners 154 to a position above the uppermost collapsed cardboard case A. Specifically, the controller 500 causes the suctioners 154 to come into proximity to, or come into contact with, a predetermined suction position on a side portion A1 of the collapsed cardboard case A. At the time, the controller 500 controls the posture of the mounting base 151 and the holder 153 of the first hand 150 such that the direction of the coupling rotating shaft 152 is a horizontal direction that is substantially parallel to the first direction D1, and such that the nozzles of the suctioners 154 face downward.

Further, the controller 500 operates the second arm 140 to move the second hand 160 to a predetermined standby position above a side portion A2 of the uppermost collapsed cardboard case A. At the time, the controller 500 controls the posture of the second hand 160 to cause the contact surface 162a of the lateral portion 162 to face horizontally in the first direction D1A, cause the longitudinal direction of the contact surface 162a to be a horizontal direction that is substantially parallel to a boundary C12 between the side portions A1 and A2, and cause the main surface 163a of the lower portion 163 to face downward. The lower portion 163 is located in the first direction D1B relative to the contact surface 162a.

As a non-limiting example, in the present embodiment, the predetermined suction position is a position on the side portion A1 among four side portions A1 to A4 of the cardboard case A, and is a position near the boundary C12 extending along the second direction D2. The side portions A1 and A2 are side portions, of the uppermost collapsed cardboard case A, that face upward and that are adjacent to each other. The side portion A2 is located in the first direction D1B relative to the side portion A1. At such a predetermined suction position, the stiffness of the cardboard case A is high. For this reason, in a case where the cardboard case A is suctioned at the predetermined suction position, the suction force of the suctioners 154 can be lowered. The predetermined suction position and the predetermined standby position are determined in advance corresponding to the configuration of the cardboard case A, and are prestored in the storage 559. The controller 500 retrieves, from the storage 559, the predetermined suction position and the predetermined standby position corresponding to the configuration of the cardboard case A received in step S101, and uses these retrieved suction position and standby position.

The side portions A1 and A3 of the box-shaped cardboard case A are opposite each other, and are long side portions of the cardboard case A. The side portions A2 and A4 of the box-shaped cardboard case A are opposite each other, and are short side portions of the cardboard case A. In a circumferential direction surrounding the side portions A1 to A4, the long side portions are longer than the short side portions. In the circumferential direction, the lengths of the side portions A1 and A3 may be the same as the lengths of the side portions A2 and A4.

The controller 500 may perform the operation of moving the suctioners 154 of the first hand 150 and the operation of moving the second hand 160 in parallel, such that these operations overlap timewise at least partly. Alternatively, the controller 500 may perform these operations one after the other sequentially.

Figure 7:
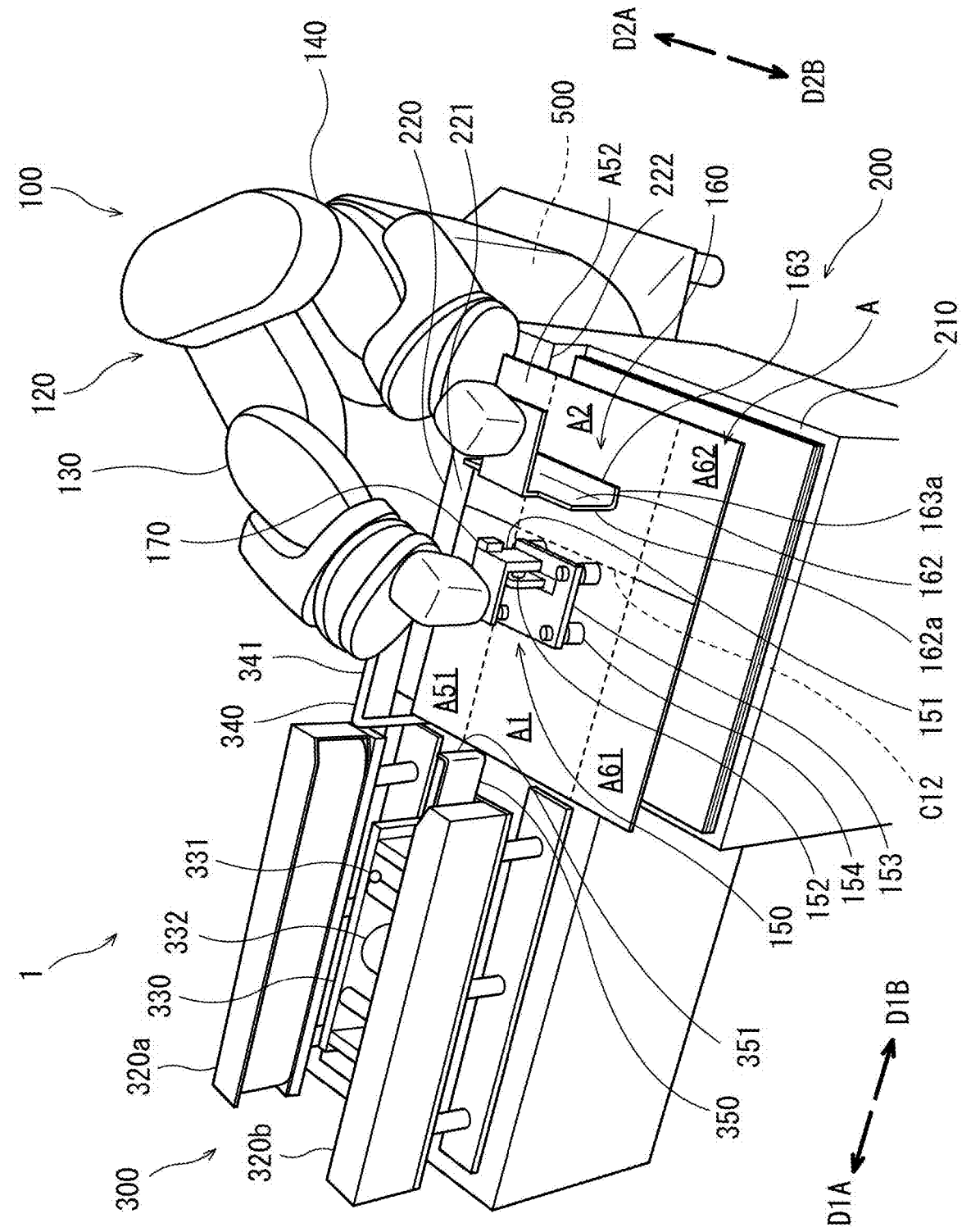
FIG. 7 is a perspective view showing one example of the state of the robot while the robot system according to the embodiment is in operation.

Next, as shown in FIG. 5, the controller 500 performs step S107, which is a step of suctioning and opening the uppermost collapsed cardboard case A. After the suctioners 154 have arrived at the predetermined suction position, the controller 500 starts the negative pressure generator 155 to generate negative pressure in the suctioners 154. The timing of starting the negative pressure generator 155 may be any of the following: before the suctioners 154 arrive at the predetermined suction position; at the same time as the suctioners 154 arrive at the predetermined suction position; and after the suctioners 154 have arrived at the predetermined suction position. Then, as shown in FIG. 7, when detecting that the collapsed cardboard case A is being suctioned by the suctioners 154, the controller 500 raises the first hand 150. The controller 500 may detect that the collapsed cardboard case A is being suctioned, by detecting the generation of the negative pressure in the suctioners 154. For example, based on a change in the load on the negative pressure generator 155, or based on a detection value from a pressure sensor (not shown) that is provided on the suctioners 154, the piping, or the negative pressure generator 155, the controller 500 may detect the generation of the negative pressure in the suctioners 154.

Figure 8:
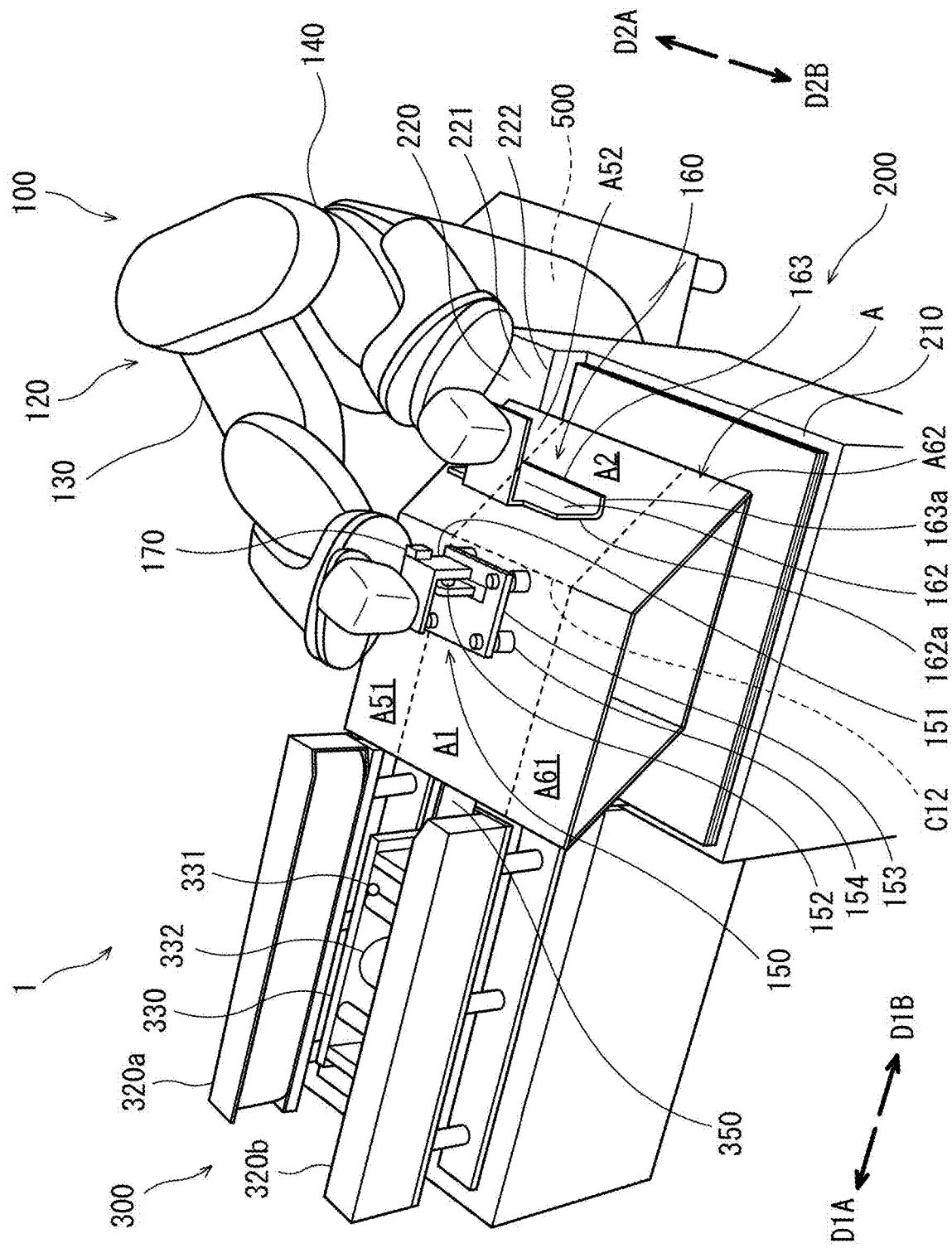
FIG. 8 is a perspective view showing one example of the state of the robot while the robot system according to the embodiment is in operation.

The controller 500 raises the second hand 160 together with the first hand 150 until the first hand 150 reaches a first predetermined height position. As shown in FIG. 8, after the first hand 150 has reached the first predetermined height position, the controller 500 lowers the second hand 160 while raising the first hand 150. The lower portion 163 comes into contact with, and pushes downward, the side portion A2 of the collapsed cardboard case A to make a mountain fold at the boundary C12, thereby opening the collapsed cardboard case A. Since the longitudinal direction of the main surface 163a of the lower portion 163 is a horizontal direction substantially parallel to the boundary C12, the folding at the boundary C12 can be performed smoothly and accurately. For example, the first predetermined height position may be such a height position that when the collapsed cardboard case A starts to be opened, it does not come into contact with the second collapsed cardboard case A positioned below.

Figure 9:
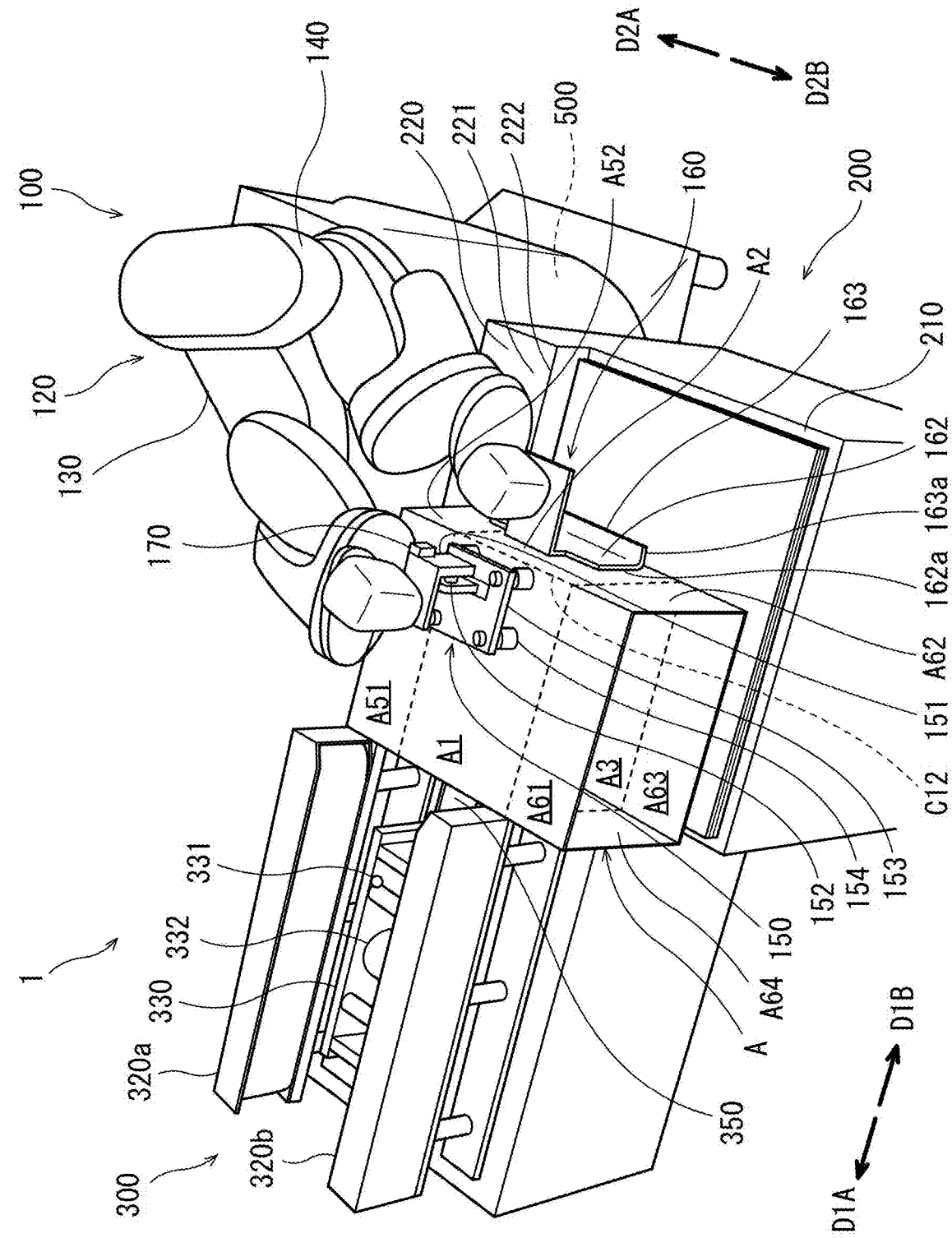
FIG. 9 is a perspective view showing one example of the state of the robot while the robot system according to the embodiment is in operation.

Further, as shown in FIG. 9, when the first hand 150 has been raised to a second predetermined height position, the controller 500 moves the second hand 160 in the first direction D1A. The lateral portion 162 comes into contact with the side portion A2 of the cardboard case A, and pushes the side portion A2 in the first direction D1A to bring the side portion A2 close to an upright state. Based on the positional relationship between the first hand 150 and the second hand 160, the controller 500 continues moving the second hand 160 until the side portion A2 becomes substantially perpendicular to the side portion A1. That is, the controller 500 causes the lateral portion 162 to be pressed against the side portion A2, such that the side portion A2 is folded relative to the side portion A1 at the boundary C12. At the time, the controller 500 may causes the lateral portion 162 to be pressed against the side portion A2, such that the side portion A2 is folded by an intended folding angle or by a folding angle greater than the intended folding angle. The intended folding angle is the folding angle of the side portion A2 when the side portion A2 and the side portion A1 are perpendicular to each other. The folding angle greater than the intended folding angle is the folding angle of the side portion A2 when the angle formed by the side portion A2 and the side portion A1 is an acute angle. As a result of performing the above-described operations, the cardboard case A is opened into a rectangular tubular shape. For example, the second predetermined height position may be such a height position that the cardboard case A in the opened state does not contact the second collapsed cardboard case A. The side portion A2 herein is one example of a fifth foldable portion.

The controller 500 may perform the operation of raising the first hand 150, the operation of lowering the second hand 160, and the operation of moving the second hand 160 in the first direction D1A sequentially one after another, or may perform these operations in parallel such that these operations overlap timewise at least partly.

Next, as shown in FIG. 5, the controller 500 performs step S108, which is a step of folding bottom flaps A52 and A54 inward, which are located laterally among bottom flaps A51 to A54 of the bottom A5 of the cardboard case A in the opened state. That is, the controller 500 performs a second folding process and a third folding process.

As a result of being folded inward, the bottom flaps A51 to A54 form the bottom A5 of the cardboard case A. Before being folded inward, all the bottom flaps A51 to A54 extend in the same direction from the side portions A1 to A4, respectively. The bottom flaps A51 and A53 are the flaps of the respective long sides of the bottom A5, and the bottom flaps A52 and A54 are the flaps of the respective short sides of the bottom A5. As a result of being folded inward, top flaps A61 to A64 form the top A6 of the cardboard case A. Before being folded inward, all the top flaps A61 to A64 extend in a direction opposite the extending direction of the bottom flaps A51 to A54 from the respective side portions A1 to A4. For example, in steps S101 to S107, the bottom flaps A51 to A54 extend in the second direction D2A, and the top flaps A61 to A64 extend in the second direction D2B. One of the bottom flaps A51 and A53 is one example of a first foldable portion, and the other one of the bottom flaps A51 and A53 is one example of a second foldable portion. The bottom flap A54 is one example of a third foldable portion, and the bottom flap A52 is one example of a fourth foldable portion.

Figure 10:
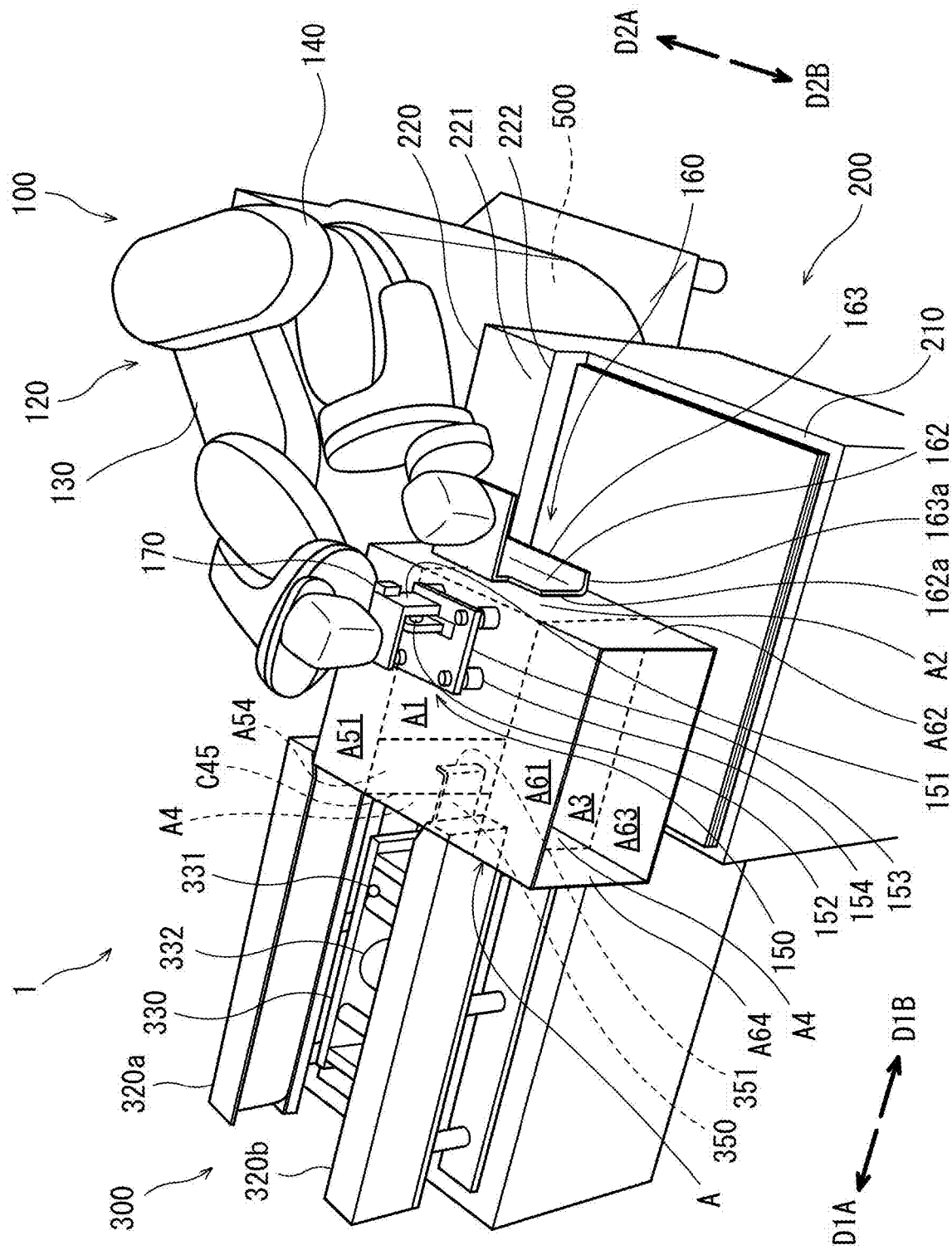
FIG. 10 is a perspective view showing one example of the state of the robot while the robot system according to the embodiment is in operation.

First, as shown in FIG. 10, the controller 500 performs the second folding process. The controller 500 moves the first hand 150 in the first direction D1A to bring the bottom flap A54 into contact with, and to cause the bottom flap A54 to be pushed inward by, the lateral contacting portion 351 of the lateral auxiliary member 350. As a result, the bottom flap A54 is folded inward such that the end thereof faces in the first direction D1B. The direction in which the lateral contacting portion 351 extends is the same as the direction in which a boundary C45 between the bottom flap A54 and the side portion A4 extends. Therefore, the lateral contacting portion 351 can fold the bottom flap A54 inward smoothly and accurately along the boundary C45. The controller 500 also moves the second hand 160 in the same manner as the first hand 150 while keeping the contact surface 162a of the lateral portion 162 in contact with the side portion A2. This makes it possible to suppress deformation of the cardboard case A while the bottom flap A54 is being folded inward.

Figure 11:
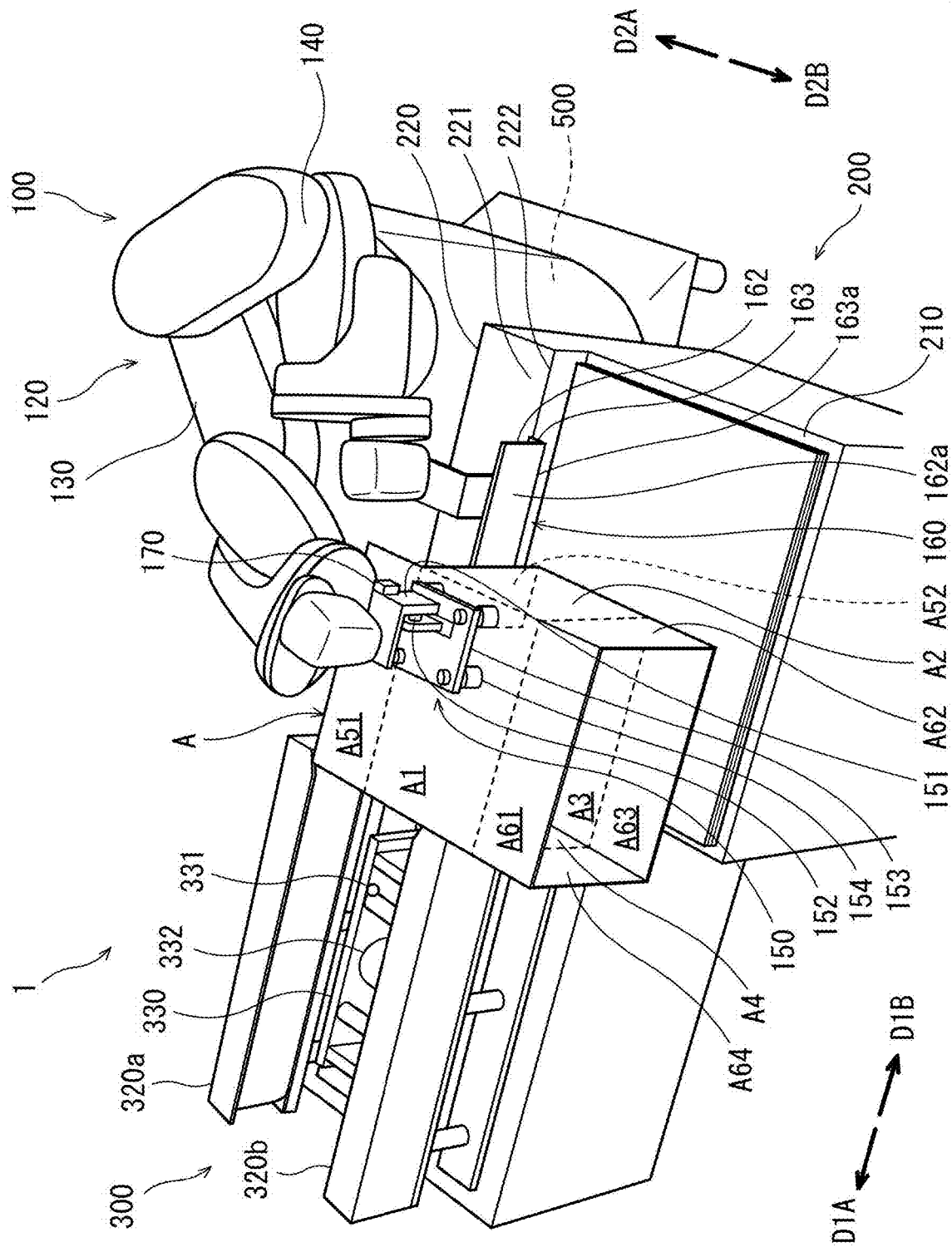
FIG. 11 is a perspective view showing one example of the state of the robot while the robot system according to the embodiment is in operation.

Further, as shown in FIG. 11, the controller 500 performs the third folding process. The controller 500 rotates the second hand 160 about the sixth axis S6b (see FIG. 2) to bring the contact surface 162a of the lateral portion 162 into contact with the bottom flap A52, and to change the facing direction of the contact surface 162a from the first direction D1A to the second direction D2B. As a result, the lateral portion 162 folds the bottom flap A52 inward such that the end of the bottom flap A52 faces in the first direction D1A. The controller 500 may move the second hand 160 to adjust the position of the contact surface 162a.

The controller 500 may perform the second folding process and the third folding process sequentially one after the other, or may perform the second and third folding processes in parallel such that these processes overlap timewise at least partly.

Next, as shown in FIG. 5, the controller 500 performs step S109, which is a step of folding the bottom flaps A51 and A53 inward, which are located in the upward-downward direction at the bottom A5 of the cardboard case A in the opened state. That is, the controller 500 performs a first folding process.

Figure 12:
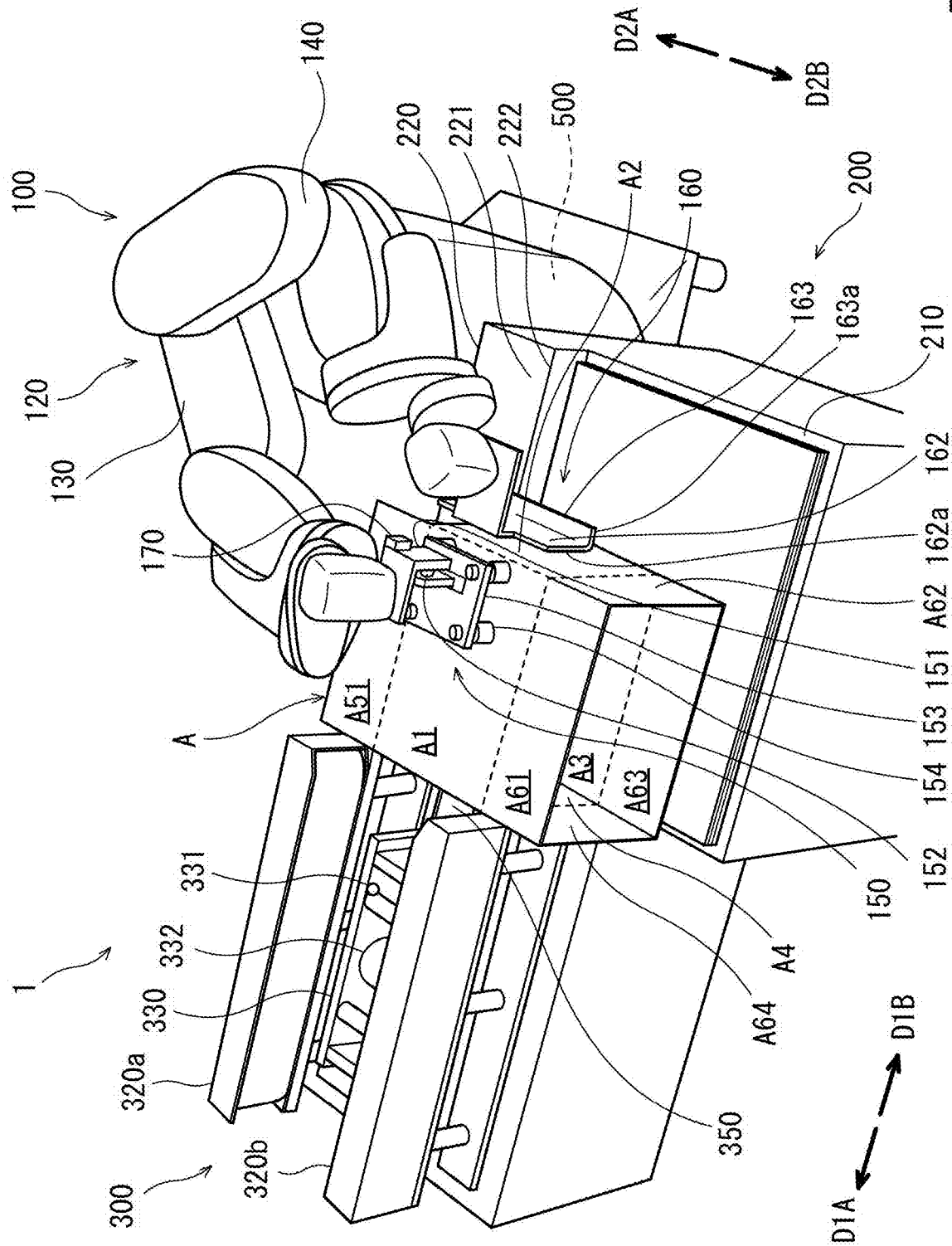
FIG. 12 is a perspective view showing one example of the state of the robot while the robot system according to the embodiment is in operation.

First, as shown in FIG. 12, the controller 500 rotates the second hand 160 to change the facing direction of the contact surface 162a of the lateral portion 162 from the second direction D2B to the first direction D1A, thereby bringing the contact surface 162a into contact with the side portion A2 of the cardboard case A. Further, the controller 500 moves the first hand 150 and the second hand 160 to locate the bottom flap A53 above the lower contacting portions 221 and 222 of the lower auxiliary member 220.

Next, as shown in FIG. 13 and FIG. 14, the controller 500 lowers the first hand 150 to bring the bottom flap A53 into contact with, and to cause the bottom flap A53 to be pushed inward by, the lower contacting portions 221 and 222. As a result, the bottom flap A53 is folded such that the end of the bottom flap A53 faces upward. The direction in which the second lower contacting portion 222 extends is the same as the direction in which a boundary C35 between the bottom flap A53 and the side portion A3 extends, and is a direction crossing the direction in which the bottom flap A54 is folded. Therefore, with the second lower contacting portion 222, the bottom flap A53 can be folded smoothly and accurately along the boundary C35.

Figure 15:
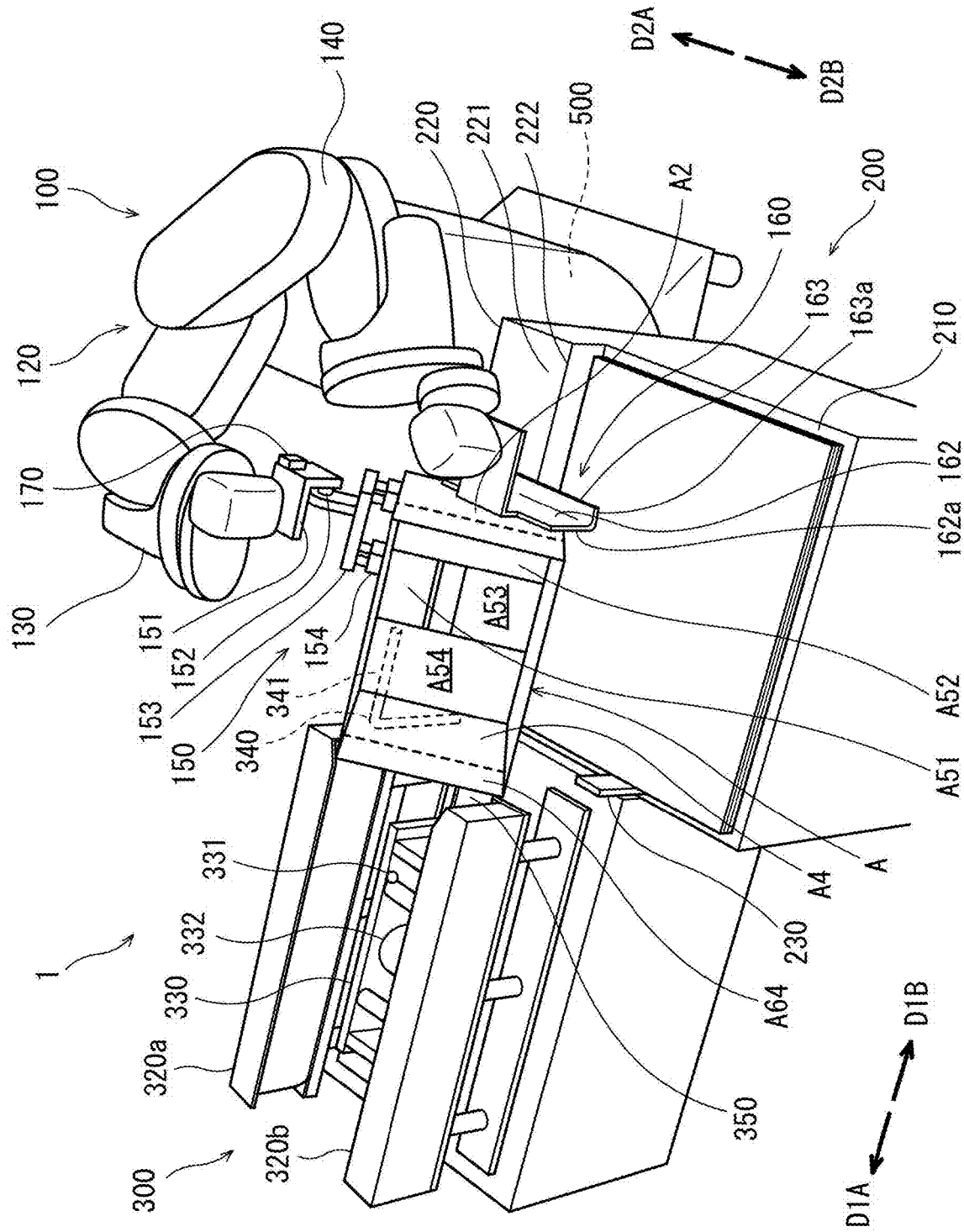
FIG. 15 is a perspective view showing one example of the state of the robot while the robot system according to the embodiment is in operation.
Figure 16:
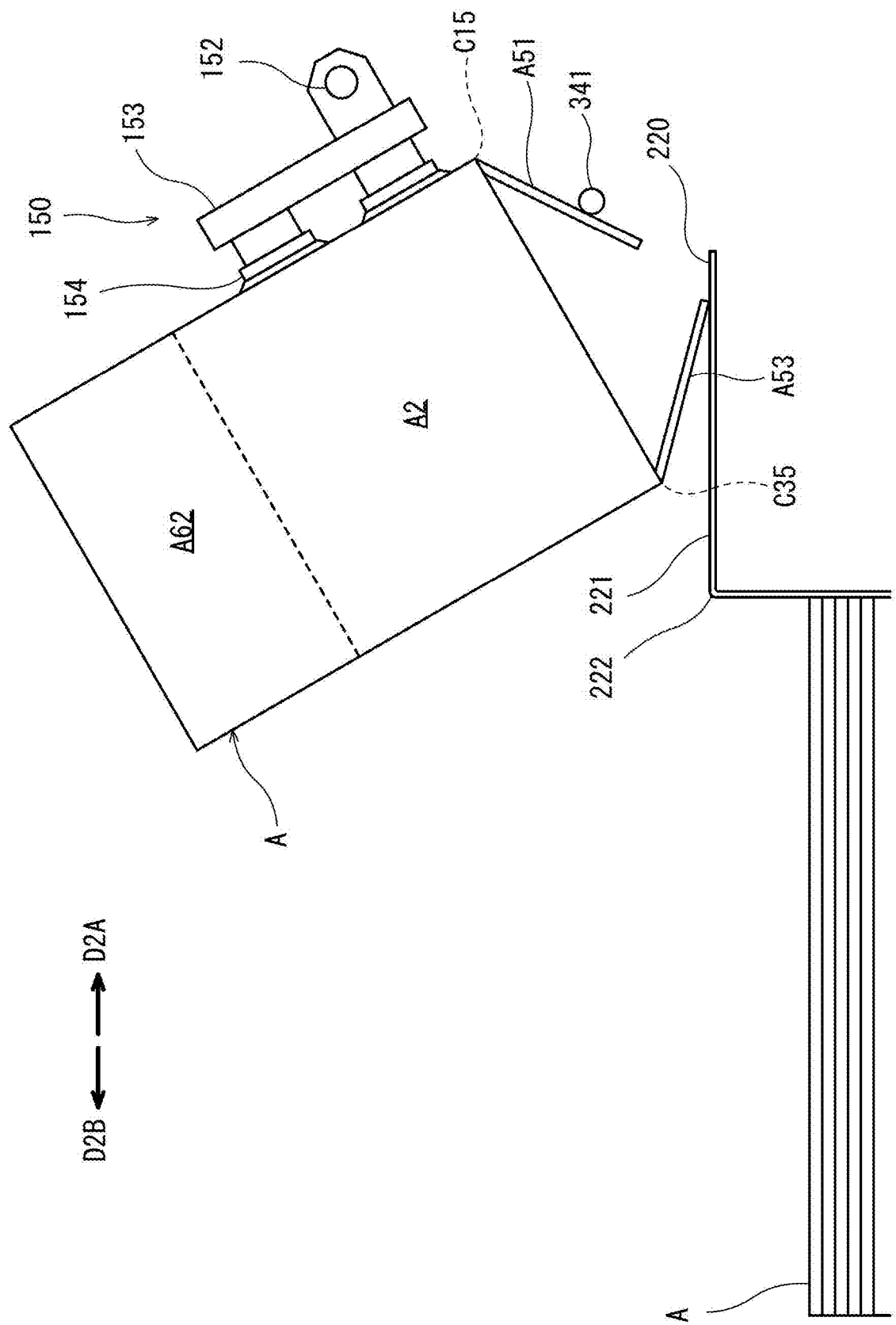
FIG. 16 is an enlarged side view of a part of FIG. 15.

Next, as shown in FIG. 15 and FIG. 16, the controller 500 stops lowering the first hand 150, and moves the first hand 150 in the second direction D2A while rotating the holder 153 of the first hand 150. At the time, the cardboard case A is moved in the second direction D2A while changing its posture such that the top flaps A61 to A64 are brought into an upright state facing upward. The bottom flap A53 is pressed against the lower contacting portion 221 or 222, and further folded inward. The bottom flap A51 is brought into contact with, and pushed inward by, the upper contacting portion 341 of the upper auxiliary member 340, and thereby folded such that the end of the bottom flap A51 faces the bottom flap A53. That is, by rotating the holder 153 while keeping the bottom flaps A51 and A53 in contact with the upper contacting portion 341 and the lower contacting portion 221 or 222, the bottom flaps A51 and A53 are folded. At the time, the direction in which the upper contacting portion 341 and the second lower contacting portion 222 extend coincides with the direction of the coupling rotating shaft 152. The upper contacting portion 341 is located away from the lower contacting portions 221 and 222 in the rotational direction of the holder 153.

Figure 17:
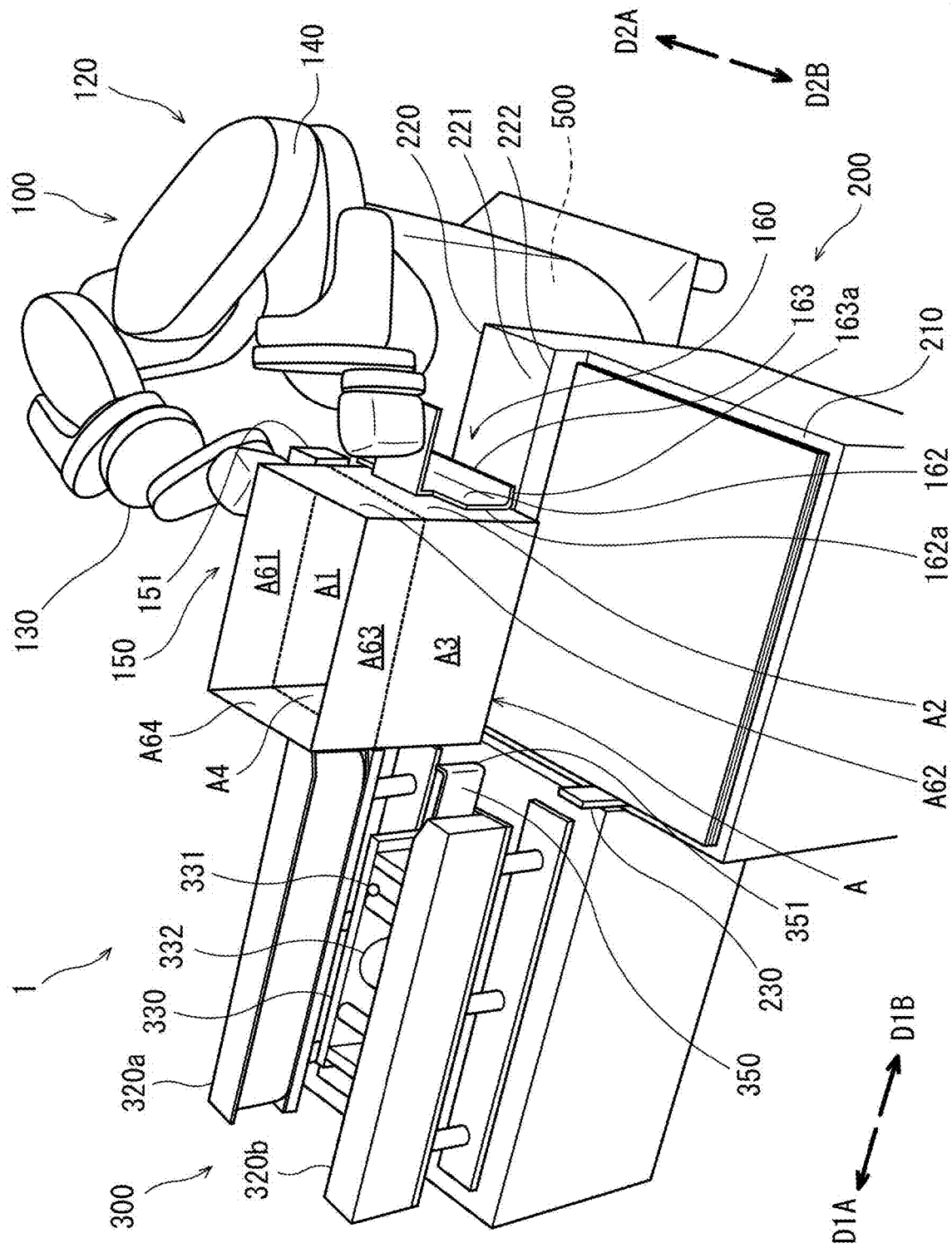
FIG. 17 is a perspective view showing one example of the state of the robot while the robot system according to the embodiment is in operation.

Next, as shown in FIG. 17, the controller 500 stops moving the first hand 150 in the second direction D2A, but continues rotating the holder 153 and lowers the first hand 150. At the time, the cardboard case A moves downward in an upright state. Accordingly, the bottom flap A51 is pressed against the upper contacting portion 341, and further folded inward. When the holder 153 has become upright, the controller 500 stops rotating the holder 153 and stops lowering the first hand 150. At the time, the cardboard case A is upright with the bottom flaps A51 and A53 located at the bottom, i.e., being a box-shaped cardboard case.

Figure 18:
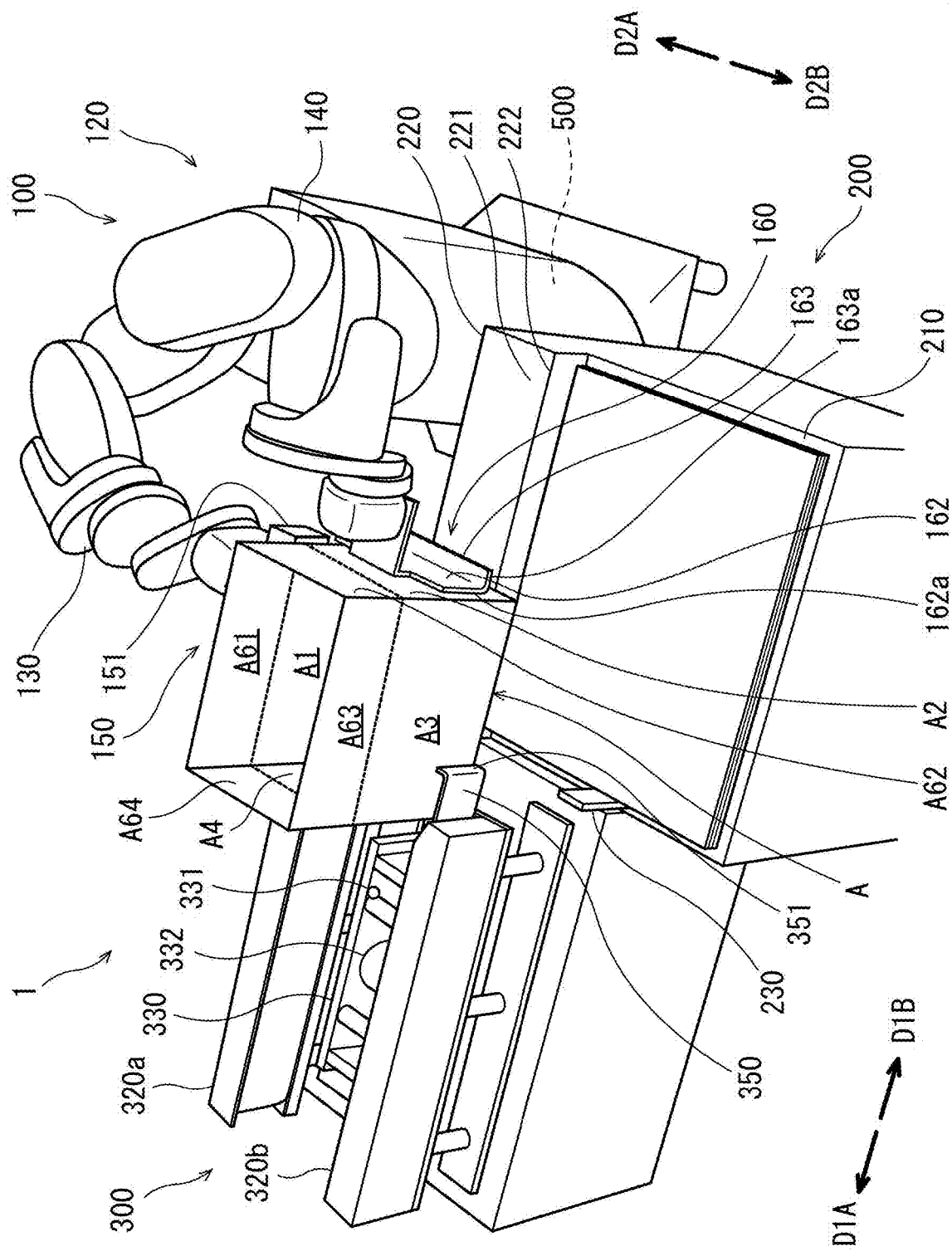
FIG. 18 is a perspective view showing one example of the state of the robot while the robot system according to the embodiment is in operation.

Next, as shown in FIG. 5 and FIG. 18, in step S110, the controller 500 moves the first hand 150 in the first direction D1A to move the box-shaped cardboard case A to a position between the conveyors 320a and 320b. At the time, the controller 500 may move the first hand 150 such that the box-shaped cardboard case A is moved in contact with the first lower contacting portion 221.

Next, in step S111, the sealer 330 affixes tape to a joint between the bottom flaps A51 and A53 of the box-shaped cardboard case A conveyed by the conveyors 320a and 320b, thereby sealing the bottom A5 of the box-shaped cardboard case A.

As described above, the robot system 1 according to the embodiment performs the processes in steps S103 to S111 in accordance with the configuration of the cardboard case A inputted in step S101 and the command inputted in step S102, thereby automatically performing the assembling of the collapsed cardboard case A, i.e., performing case forming, by using the robot 100.

<Advantageous Effects, etc.>

The robot system 1 according to the embodiment includes: the first hand 150, which holds a cardboard case A; the first arm 130, which moves the first hand 150; and the upper contacting portion 341 or the lower contacting portions 221 and 222, with which the bottom flap A51 or A53 of the cardboard case A is brought into contact during the first folding process, which is a process of folding the bottom flap A51 or A53 in a state where the cardboard case A is held by the first hand 150. The first hand 150 further includes: the mounting base 151, which is connected to the first arm 130; and the holder 153, which is rotatable relative to the mounting base 151 and holds the cardboard case A by adhesion. During the first folding process, the first hand 150 and the first arm 130 fold the bottom flap A51 or A53 by rotating the holder 153 while keeping the bottom flap A51 or A53 in contact with the upper contacting portion 341 or the lower contacting portion 221 or 222.

According to the above configuration, by moving the first hand 150 and rotating the holder 153, the robot system 1 can press the bottom flap A51 or A53 of the cardboard case A against the upper contacting portion 341 or the lower contacting portion 221 or 222, and thereby can fold the bottom flap A51 or A53. This makes it possible to simplify the operation of the first hand 150 and the first arm 130 for folding the bottom flap A51 or A53. The configuration for folding the bottom flap A51 or A53 may merely include the first arm 130, the first hand 150 including the rotatable holder 153, and the upper contacting portion 341 or the lower contacting portion 221 or 222. Thus, the configuration for folding the bottom flap A51 or A53 can be simplified. The upper contacting portion 341 and the lower contacting portions 221 and 222 can be extended in the first direction D1. This makes it possible to perform stable folding of the bottom flap A51 or A53, which is long in the first direction D1.

The upper contacting portion 341 or the second lower contacting portion 222 may extend in the direction in which the coupling rotating shaft 152 of the holder 153 extends during the first folding process. According to this configuration, with the upper contacting portion 341 or the second lower contacting portion 222, a fold line extending in a direction substantially perpendicular to the rotational direction of the holder 153 can be formed, and the bottom flap A51 or A53 can be folded along the fold line. For example, during the first folding process, by controlling the position and posture of the first hand 150 such that the direction in which the coupling rotating shaft 152 extends and the direction in which the upper contacting portion 341 or the second lower contacting portion 222 extends coincide with each other, the bottom flap A51 or A53 can be folded smoothly and accurately.

The direction in which the coupling rotating shaft 152 of the holder 153 extends may cross the direction in which the mounting base 151 and the first arm 130 are connected to each other. According to this configuration, the first hand 150 can rotate the holder 153 in a direction that crosses the rotational direction of the first hand 150 about the sixth axis S6a. This increases the degree of freedom in the position and posture of the holder 153.

The holder 153 may be rotatable relative to the mounting base 151 over a rotational angle range of at least 90°. According to this configuration, the first hand 150 can change, by merely rotating the holder 153, the posture of the cardboard case A held by the holder 153 such that, for example, the side portion A1 in a horizontal state is brought into a vertical state. This increases the degree of freedom in the position and posture of the cardboard case A held by the holder 153.

The holder 153 may include the suctioner(s) 154, which suctions the cardboard case A. According to this configuration, the holder 153 can adhere to and hold the cardboard case A by suction. Therefore, the holder 153 can hold the cardboard case A in a manner to reduce negative influences, such as damage, on the surface of the cardboard case A.

The robot system 1 according to the embodiment may include the upper contacting portion 341 and the lower contacting portions 221 and 222, which are disposed away from each other in the rotational direction of the holder 153 during the first folding process. The cardboard case A may include the bottom flaps A51 and A53, which are disposed opposite each other. During the first folding process, the first hand 150 and the first arm 130 may fold the bottom flaps A51 and A53 by bringing the bottom flap A51 into contact with the upper contacting portion 341 and bringing the bottom flap A53 into contact with the lower contacting portion 221 or 222. According to this configuration, by rotating the holder 153 to press the bottom flaps A51 and A53 against the upper contacting portion 341 and the lower contacting portion 221 or 222, respectively, the bottom flaps A51 and A53 can be folded. This makes it possible to simplify the configuration for folding the bottom flaps A51 and A53, and to simplify the operation of the first hand 150 and the first arm 130 for folding the bottom flaps A51 and A53.

The robot system 1 according to the embodiment may include the lateral contacting portion 351, with which the bottom flap A54 of the cardboard case A is brought into contact during the second folding process, which is a process of folding the bottom flap A54 in a state where the cardboard case A is held by the first hand 150. The bottom flap A54 may be folded in a direction crossing the direction in which the bottom flaps A51 and A53 are folded. During the second folding process, the first hand 150 and the first arm 130 may fold the bottom flap A54 by moving the cardboard case A to press the bottom flap A54 against the lateral contacting portion 351. According to this configuration, by moving the first hand 150 in such a direction as to press the bottom flap A54 against the lateral contacting portion 351, the bottom flap A54 can be folded. This makes it possible to simplify the configuration for folding the bottom flap A54, and to simplify the operation of the first hand 150 and the first arm 130 for folding the bottom flap A54.

The lateral contacting portion 351 may extend in a direction crossing the direction in which the bottom flap A54 is folded. According to this configuration, with the lateral contacting portion 351, a fold line extending in the direction in which the lateral contacting portion 351 extends can be formed, and the bottom flap A54 can be folded along the fold line. The direction in which the fold line extends crosses the direction in which the bottom flap A54 is folded. This makes it possible to smoothly and accurately fold the bottom flap A54.

The robot system 1 according to the embodiment may include the first hand 150, the first arm 130, the second hand 160, and the second arm 140. The cardboard case A may include the bottom flap A52, which is to be folded in a direction crossing the direction in which the bottom flap A51 or A53 is folded. During the third folding process of folding the bottom flap A52 of the cardboard case A in a state where the cardboard case A is held by the first hand 150, the second hand 160 and the second arm 140 may fold the bottom flap A52 by rotating the second hand 160 while keeping the second hand 160 in contact with the bottom flap A52. The robot system 1 may include the robot body 120 including the first arm 130 and the second arm 140, which are coaxially rotatable. The robot body 120 may be a coaxial dual-arm robot.

According to the above configuration, by rotating the second hand 160 in contact with the bottom flap A52, the bottom flap A52 can be folded. This makes it possible to simplify the configuration for folding the bottom flap A52, and to simplify the operation of the second hand 160 and the second arm 140 for folding the bottom flap A52. Further, the robot body 120, which is a coaxial dual-arm robot, makes it possible to reduce the necessary work space.

The cardboard case A may form into a bottomed tubular shape by being subjected to the folding processes. The second hand 160 and the second arm 140 may perform assisting to assist the cardboard case A in forming into and keeping the tubular shape by bring the second hand 160 into contact with the cardboard case A. According to this configuration, the cardboard case A can be readily opened into a tubular shape. Also, deformation of the tubular-shaped cardboard case A during the folding processes can be suppressed. This makes it possible to perform smooth and accurate flap folding at intended positions.

The cardboard case A may form into a bottomed rectangular tubular shape by being subjected to the folding processes. The first hand 150 and the first arm 130 may cause the cardboard case A to form into the rectangular tubular shape by holding and lifting the cardboard case A. When the first hand 150 and the first arm 130 cause the cardboard case A to form into the rectangular tubular shape, the second hand 160 and the second arm 140 may perform the aforementioned assisting by bringing the second hand 160 into contact with, or pressing the second hand 160 against, the cardboard case A laterally. According to this configuration, the cardboard case A can be readily opened into the rectangular tubular shape.

The second hand 160 and the second arm 140 may fold the side portion A2, which is the fifth foldable portion of the cardboard case A that is to form into a rectangular tubular shape, at a folding angle that is greater than or equal to an intended folding angle by pressing the second hand 160 against the cardboard case A. According to this configuration, folding the side portion A2 at the folding angle that is greater than or equal to the intended folding angle allows the side portion A2 to readily keep the intended folding angle. This allows the cardboard case A to readily keep its intended shape in an opened state. Consequently, the folding processes of folding the bottom flaps A51 to A54 become smooth.

The cardboard case A may form into a bottomed tubular shape by being subjected to the folding processes, and the bottom flaps A51 to A54 may form the bottom A5 of the cardboard case A by being subjected to the folding processes. According to this configuration, the robot system 1 can assemble the collapsed cardboard case A into a box-shaped cardboard case whose top is open. Then, by merely sealing the bottom A5, the box-shaped cardboard case A is ready to be used, for example, for packing an article therein.

Other Embodiments

Although the examples of the embodiment of the present disclosure have been described as above, the present disclosure is not limited to the above-described embodiment. That is, various modifications and improvements can be made within the scope of the present disclosure. For example, embodiments in which various modifications are implemented on the above-described embodiment, and embodiments in which components in different embodiments are combined, also fall within the scope of the present disclosure.

For example, in the above-described embodiment, the robot body 120 is a horizontal articulated robot. However, the robot body 120 is not limited to a horizontal articulated robot. For example, the robot body 120 may be a vertical articulated robot, a polar coordinate robot, a cylindrical coordinate robot, a Cartesian coordinate robot, or yet another type of robot. The first hand 150 and the second hand 160 are mounted to the horizontal articulated first arm 130 and the horizontal articulated second arm 140, respectively. However, the types of the arms to which the first hand 150 and the second hand 160 are mounted are not thus limited. The first hand 150 and the second hand 160 may be mounted to different types of arms, respectively.

In the above-described embodiment, the robot body 120 is a dual-arm robot including the first arm 130 and the second arm 140. However, this is merely a non-limiting example. As an alternative example, the robot body 120 may include only one arm, or may include three or more arms. For example, the first arm 130 and the second arm 140 may be mounted to different robot bodies, respectively.

In the above-described embodiment, each of the first arm 130 and the second arm 140 includes five links that are connected to each other. However this is merely a non-limiting example. The number of links included in each of the first arm 130 and the second arm 140 may be four or less, or may be six or more.

In the above-described embodiment, the suctioners 154 suction an object by generating negative pressure. However, this is merely a non-limiting example. For example, the suctioners 154 may adhere to an object with adhesive force. Alternatively, the suctioners 154 may include suction cups that are made of, for example, flexible rubber or resin, and may suction an object by pressing the suction cups against the object. Further, in order to increase the suction force, the suctioners 154 may include a mechanism that sucks the air from the suction surfaces of the suction cups.

In the above-described embodiment, the placement surface 210 is fixed to the placement table 200. However, this is merely a non-limiting example. For example, the placement table 200 may include a lift that lifts and lowers the placement surface 210. In this case, the controller 500 may control the lift to lift the placement surface 210 in parallel with progress on the assembling of collapsed cardboard cases A on the placement surface 210. This makes it possible to keep the height position of the uppermost collapsed cardboard case A relative to the robot body 120 to a constant position. Accordingly, regardless of the limitation in the range of motion of the first arm 130 and the second arm 140 in the upward-downward direction, the robot body 120 can assemble all the collapsed cardboard cases A on the placement surface 210.

In the above-described embodiment, the controller 500 uses an image captured by the image capturer 170 to detect the three-dimensional position of the collapsed cardboard case A on the placement surface 210 relative to the first hand 150. However, this is merely a non-limiting example. For example, the first hand 150 or the like may include a sensor that measures the distance between the first hand 150 and the collapsed cardboard case A. The controller 500 may detect the positional relationship between the first hand 150 and the collapsed cardboard case A by using the distance measured by the sensor. Examples of the sensor include a photoelectric sensor, a laser sensor, and an ultrasonic sensor.

In the above-described embodiment, the number of bottom flaps forming the bottom A5 of the cardboard case A is not limited to four, but may be one or more and three or less, or may be five or more. In this case, the robot system 1 may assemble the collapsed cardboard case A by suitably selecting and using, for example, any of the following: the upper auxiliary member 340; the lower auxiliary member 220; the lateral auxiliary member 350; and the lateral portion 162 and the lower portion 163 of the second hand 160.

In the above-described embodiment, the controller 500 controls the robot 100, the conveyors 320a and 320b, and the sealer 330. However, this is merely a non-limiting example. For example, at least either the conveyors 320a and 320b or the sealer 330 may be controlled by a different controller, for example, a controller included therein. This makes it possible to use general-purpose conveyors and a general-purpose sealer.

REFERENCE SIGNS LIST 1 robot system
120 robot body
130 first arm
140 second arm
150 first hand
151 mounting base
152 coupling rotating shaft
153 holder
154 suctioner
160 second hand 221, 222 lower contacting portion (first contacting portion, second contacting portion)
341 upper contacting portion (first contacting portion, second contacting portion)
351 lateral contacting portion (third contacting portion)
500 controller
A cardboard case (article)
A2 side portion (fifth foldable portion)
A51, A53 bottom flap (first foldable portion, second foldable portion)
A52 bottom flap (fourth foldable portion)
A54 bottom flap (third foldable portion)

The invention claimed is:

1. A robot system comprising:
a first hand that holds an article, the article including a first foldable portion and a second foldable portion that is to be folded in a direction crossing a direction in which the first foldable portion is folded, the article forming into a bottomed tubular shape by being subjected to folding processes;
a first arm that moves the first hand;
a second hand;
a second arm that moves and rotates the second hand; and
a first contacting portion with which the first foldable portion of the article is brought into contact during a first folding process that is a process of folding the first foldable portion in a state where the article is held by the first hand, wherein
the first hand includes:
  a base that is connected to the first arm; and
  a holder that includes a suctioner and that is rotatable relative to the base and holds the article by suction,
the second hand includes a contact surface that faces in a direction crossing a rotational axis of the second hand and that rotates together with the second hand,
the first hand and the first arm cause the article in a collapsed state to form into a rectangular tubular shape by holding and lifting the article,
when the first hand and the first arm cause the article to form into the rectangular tubular shape, the second hand and the second arm perform assisting to assist the article in forming into and keeping the rectangular tubular shape by bringing the contact surface of the second hand into contact with, or pressing the contact surface of the second hand against, the article laterally,
during the first folding process, the first hand and the first arm fold the first foldable portion of the article in the rectangular tubular shape by rotating the holder while keeping the first foldable portion in contact with the first contacting portion,
the second hand and the second arm perform assisting to assist the article in keeping the rectangular tubular shape by bringing the contact surface of the second hand into contact with the article, and
during a second folding process of folding the second foldable portion of the article in a state where the article in the rectangular tubular shape is held by the first hand, the second hand and the second arm fold the second foldable portion by rotating the contact surface of the second hand while keeping the contact surface of the second hand in contact with the second foldable portion.

2. The robot system according to claim 1, wherein the first contacting portion extends in a direction in which a rotating shaft of the holder extends during the first folding process.

3. The robot system according to claim 1, wherein a direction in which a rotating shaft of the holder extends crosses a direction in which the base and the first arm are connected to each other.

4. The robot system according to claim 1, wherein the holder is rotatable relative to the base over a rotational angle of at least 90°.

5. The robot system according to claim 1, further comprising a second contacting portion that is disposed away from the first contacting portion in a rotational direction of the holder during the first folding process, wherein
the article further includes a third foldable portion that is disposed opposite the first foldable portion, and
during the first folding process, the first hand and the first arm fold the first foldable portion and the third foldable portion by bringing the first foldable portion into contact with the first contacting portion and bringing the third foldable portion into contact with the second contacting portion.

6. The robot system according to claim 5, wherein the second contacting portion extends in a direction in which a rotating shaft of the holder extends during the first folding process.

7. The robot system according to claim 1, further comprising:
a third contacting portion with which a fourth foldable portion of the article is brought into contact during a third folding process that is a process of folding the fourth foldable portion in a state where the article in the rectangular tubular shape is held by the first hand, wherein
the fourth foldable portion is folded in a direction crossing the direction in which the first foldable portion is folded, and
during the third folding process, the first hand and the first arm fold the fourth foldable portion by moving the article in a manner to press the fourth foldable portion against the third contacting portion.

8. The robot system according to claim 7, wherein the third contacting portion extends in a direction crossing the direction in which the fourth foldable portion is folded.

9. The robot system according to claim 1, further comprising a robot body including the first arm and the second arm, which are coaxially rotatable, wherein
the robot body is a coaxial dual-arm robot.

10. The robot system according to claim 1, wherein the second hand and the second arm fold a fifth foldable portion of the article that is to form into the rectangular tubular shape at a folding angle that is greater than or equal to an intended folding angle by pressing the contact surface of the second hand against the article.

* * * * *